(12) United States Patent
Uchino et al.

(10) Patent No.: US 10,172,161 B2
(45) Date of Patent: Jan. 1, 2019

(54) USER APPARATUS, BASE STATION, AND CONTROL INFORMATION DETECTION METHOD

(71) Applicant: NTT DOCOMO, INC., Tokyo (JP)

(72) Inventors: Tooru Uchino, Tokyo (JP); Kazuki Takeda, Tokyo (JP); Lan Chen, Tokyo (JP); Huiling Jiang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/114,448

(22) PCT Filed: Jan. 26, 2015

(86) PCT No.: PCT/JP2015/052020
§ 371 (c)(1),
(2) Date: Jul. 27, 2016

(87) PCT Pub. No.: WO2015/115364
PCT Pub. Date: Aug. 6, 2015

(65) Prior Publication Data
US 2016/0345364 A1  Nov. 24, 2016

(30) Foreign Application Priority Data
Jan. 30, 2014  (JP) ................. 2014-016207

(51) Int. Cl.
*H04W 74/08* (2009.01)
*H04W 72/04* (2009.01)
(Continued)

(52) U.S. Cl.
CPC ......... *H04W 74/0833* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS 9,197,387 B2 *  11/2015  Nory ............... H04L 5/0051
9,219,582 B2 *  12/2015  Yano ............... H04L 1/0046
(Continued)

FOREIGN PATENT DOCUMENTS

JP  2010-541367 A  12/2010

OTHER PUBLICATIONS

Extended European Search Report dated Dec. 5, 2016 in corresponding European Patent Application No. 15743088.5 (10 pages).
(Continued)

*Primary Examiner* — Hong S Cho
(74) *Attorney, Agent, or Firm* — Osha Liang LLP

(57) ABSTRACT

A user apparatus that communicates with a base station in a mobile communication system, including: a reception unit configured to receive a radio signal from the base station by a downlink control channel; and a control information detection unit configured to detect control information, addressed to the user apparatus, mapped to a predetermined area in a time frequency resource of the downlink control channel by performing blind decoding in a plurality of candidate areas which are candidates of the predetermined area, wherein, when the user apparatus performs a random access procedure, the control information detection unit performs the blind decoding in areas in which a part of areas is excluded from the plurality of candidate areas.

10 Claims, 25 Drawing Sheets

(51) Int. Cl.
*H04W 24/08* (2009.01)
*H04L 5/00* (2006.01)
*H04L 1/00* (2006.01)

(52) U.S. Cl.
CPC .......... *H04L 5/0053* (2013.01); *H04W 24/08* (2013.01); *H04W 72/042* (2013.01); *H04W 74/08* (2013.01); *H04L 1/0038* (2013.01)

(56) References Cited

U.S. PATENT DOCUMENTS

| | | | | |
|---|---|---|---|---|
| 9,350,510 | B2 * | 5/2016 | Park | H04L 5/0053 |
| 9,510,219 | B2 * | 11/2016 | Kim | H04L 5/001 |
| 2009/0088148 | A1 | 4/2009 | Chung et al. | |
| 2014/0301330 | A1 * | 10/2014 | Lee | H04W 74/0833 |
| | | | | 370/329 |
| 2015/0264666 | A1 * | 9/2015 | Yi | H04L 5/001 |
| | | | | 370/329 |
| 2015/0296542 | A1 * | 10/2015 | Heo | H04W 74/0833 |
| | | | | 370/329 |

OTHER PUBLICATIONS

Renesas Mobile Europe Ltd., 3GPP TSG RAN WG1 Meeting #67 "Discussion on Enabling Common Search Space on Scell", R1-113877, San Francisco, CA, USA, Nov. 14-18, 2011 (2 pages).
Research in Motion, UK Limited, 3GPP TSG-RAN WG2 #77bis, "Random Access Response in multiple TA", R2-121278, Jeju, South Korea, Mar. 26-30, 2012 (6 pages).
International Search Report issued in PCT/JP2015/052020 dated Mar. 31, 2015 (1 page).
Written Opinion of the International Searching Authority issued in PCT/JP2015/052020 dated Mar. 31, 2015 (3 pages).
Huawei, HiSilicon; "Throughput results for inter-frequency deployment of small cells"; 3GPP TSG-RAN WG2 Meeting #82, R2-131782; Fukuoka, Japan; May 20-24, 2013 (5 pages).
Office Action issued in the counterpart Japanese Patent Application No. 2014-016207, dated Oct. 24, 2017 (6 pages).

* cited by examiner

FIG.5

| CCE Aggregation level | THE NUMBER OF PDCCH CANDIDATES IN CSS | THE NUMBER OF PDCCH CANDIDATES IN USS |
|---|---|---|
| 1 | — | 6 |
| 2 | — | 6 |
| 4 | 4 | 2 |
| 8 | 2 | 2 |
| TOTAL NUMBER OF BDs | (4+2) × 2 = 12 | (6+6+2+2) × (2 or 3) = 32 or 48 |

| | DCI format USED FOR BD |
|---|---|
| CSS | DCI format 1A and 1C; THE NUMBER OF CANDIDATES × 2 |
| USS | DCI format 1A and X without UL MIMO; THE NUMBER OF CANDIDATES × 2 |
| | DCI format 1A, X and 4 with UL MIMO; THE NUMBER OF CANDIDATES × 3 |

FIG.6

| CCE Aggregation level | THE NUMBER OF EPDCCH CANDIDATES IN USS |
|---|---|
| 1 | 6 |
| 2 | 4 |
| 4 | 3 |
| 8 | 2 |
| 16 | 1 |
| TOTAL NUMBER OF BDs | (6+4+3+2+1)×(2 or 3)= 32 or 48 |

FIG.7

| THE NUMBER OF BDs | Rel-11 CA | | Dual Connectivity (DC) | |
|---|---|---|---|---|
| | Pcell | Scell | MeNB | SeNB |
| CSS | 12 | 0 | 12 | 12 |
| USS | 32 or 48 | 32 or 48 | 32 or 48 | 32 or 48 |
| TOTAL | 12+0+32+32=76 or<br>12+0+48+48=108 | | 12+12+32+32=88 or<br>12+12+48+48=120 | |

USER APPARATUS, BASE STATION, AND CONTROL INFORMATION DETECTION METHOD

TECHNICAL FIELD

The present invention relates to a technique of random access in a mobile communication system such as LTE.

BACKGROUND ART

In an LTE (including LTE-Advanced) system, a random access procedure (RA procedure, to be referred to as RA procedure hereinafter) is performed in order to synchronize timing between a user apparatus UE and a base station eNB. The RA procedure is performed, for example, in a case where the user apparatus UE initially accesses the base station eNB, or in a case where re-synchronization is performed when handover is performed, or the like. Also, as the RA procedure, there are non-contention based (contention free) RA (to be referred to as contention free RA hereinafter) which is non-contention based, and contention based RA which is contention based. For example, contention free RA is used for handover and the like, and Contention based RA is used when a user apparatus UE initially originates a call, or the like.

In the LTE system, carrier aggregation is introduced which enables communication by using a plurality of component carriers (to be referred to as CC hereinafter). As shown in FIG. 1, in CA up to Rel-10 of LTE, high throughput can be realized by performing simultaneous communication using a plurality of CCs under the the same base station eNB.

On the other hand, in Rel-12, this is further extended, so that dual connectivity (dual connectivity, to be also referred to as DC hereinafter) is being studied, in which simultaneous communication is performed by using CCs under different base stations eNB so as to realize high throughput (refer to non-patent document 1). For example, in a case where all CCs cannot be accommodated in a single base station eNB, dual connectivity is necessary to realize throughput similar to that of Rel-10.

In dual connectivity, a base station that forms a Pcell is called Master-eNB (MeNB), and a base station that forms an Scell is called Secondary-eNB (SeNB). FIG. 2 shows an example of dual connectivity. In the example of FIG. 2, a base station MeNB communicates with a user apparatus UE using a CC #1 (CC of Pcell), and a base station SeNB communicates with the user apparatus UE using a CC #2 (CC of Scell) so as to realize CA.

RELATED ART DOCUMENT

Non-Patent Document

[Non-PATENT DOCUMENT 1] 3GPP TSG-RAN WG2 Meeting #82 R2-131782

SUMMARY OF THE INVENTION

Problem to be Solved by the Invention

Regarding the RA procedure in the dual connectivity described in the background art, the RA procedure can be performed only in a Pcell in Rel-10 of LTE. On the other hand, an RA procedure in an Scell in addition to the Pcell is supported in Rel-11. However, only Contention free RA is supported, and an RAR (random access response) is received by the PCell. That is, even in an RA procedure in an Scell, the user apparatus UE receives an RAR from the base station MeNB.

FIG. 3 is a diagram compiling the above-mentioned supporting status. In the figure, Msg 0 is a message for assigning an RA preamble. Msg 1 is an RA preamble message, Msg 2 is an RAR message, and Msg 3 is an RRC connection request, and Msg 4 is an RRC connection setup. As shown in FIG. 3, in the LTE Rel-10/11, in Contention based RA, an RA procedure that the base station SeNB participates in is not supported. Although an RA procedure that the base station SeNB participates in is supported in the Contention free RA, the RAR (Msg 2) is returned from the base station MeNB. In the following, when SeNB and MeNB are collectively referred to, it is described as eNB.

In Rel-12, in both of the Contention based RA and the Contention free RA, the RAR (Msg 2) is returned from the base station SeNB.

The RAR is transmitted from the base station eNB to the user apparatus UE by a PDCCH (including EPDCCH). The RAR includes an index of a random access preamble and timing information and the like. By the way, the substance of the RAR including such information is transmitted by a PDSCH corresponding to resource assignment information transmitted by the PDCCH. Although it is correct that a pointer of RAR is transmitted by the PDCCH, a description method of "RAR is transmitted by PDCCH" is also used for the convenience sake of explanation.

Although PDCCH is a channel for carrying, by its payload, a DCI including resource assignment information and the like, there is a case that PDCCH and DCI are used as having the same meaning. A DCI is transmitted with a CRC, in which the CRC is scrambled by identification information of a user apparatus UE that is a destination of the DCI (XOR calculation, more specifically). Thus, the user apparatus UE that receives the PDCCH uses a DCI, as a DCI addressed to the user apparatus UE, that can be normally decoded by a CRC descrambled by its identification information. The identification information is an RA-RNTI in an RA procedure, for example.

A PDCCH is transmitted to a plurality of user apparatuses UE in one subframe. Since each user apparatus UE does not ascertain by which resource the PDCCH addressed to itself is transmitted, the user apparatus UE performs operation of searching resources where there is a possibility that a PDCCH addressed to the user apparatus UE is transmitted so as to detect the PDCCH addressed to the user apparatus UE.

The area of resources where the search is performed is called a search space. As the search space, there are a common search space (to be referred to as CSS, hereinafter) which is a space that every user apparatus UE commonly searches, and a UE-specific search space (to be referred to as USS, hereinafter) which is a space that each user apparatus UE individually searches.

As the smallest unit for assigning a DCI, CCE (Control Channel Element) is defined, and further, aggregation levels indicating how many CCEs an DCI (PDCCH) is assigned to are defined. For example, there are four types of aggregation levels which are 1, 2, 4 and 8, each value corresponding to the number of CCEs for assignment. Also, the aggregation level is set for each user apparatus UE, based on CQI and the like fed back from the user apparatus UE, such that the aggregation level is low when reception quality is good and that the aggregation level is high when reception quality is bad. The CCE is provided with an index, so that, when the aggregation level is n, DCI is mapped using a CCE, as a start point, of an index of multiples of n.

In the case of CSS, CCEs are assigned in a section of 16 CCEs of 0-15, and aggregation levels are limited to 4 and 8. On the other hand, there is no limitation for aggregation levels in the case of USS.

The user apparatus UE does not know which CCE a PDCCH addressed to the user apparatus UE is assigned to, which aggregation level is used, and which DCI format is used. So, the user apparatus UE performs decoding for all possible candidates. This is called blind decoding (to be referred to as BD, hereinafter).

FIG. 4 is a diagram showing an example of a PDCCH that the user apparatus UE receives in a case where an RAR is transmitted from the base station SeNB like in Rel-12 of FIG. 3. As shown in FIG. 4, the user apparatus UE transmits an RA preamble to the base station SeNB, and receives an RAR from the base station SeNB. A period of an Ra Response Window during which reception of RAR is expected starts after elapse of a predetermined period after the RA preamble is transmitted. During the Window period, searching (BD) of RAR is performed.

On the other hand, there is a possibility that the user apparatus UE receives a PDCCH (Paging, SI, RAR, and the like) addressed to the user apparatus UE also from the base station MeNB during the period of the Ra-Response Window. Thus, the user apparatus UE also performs search (BD) for the PDCCH addressed to the user apparatus UE.

In the example of FIG. 4, as an example, the aggregation level is 4 for both PDCCHes, so that the user apparatus UE performs BDs for the CSS and the USS for each of the PDCCH transmitted from the base station MeNB and the PDCCH transmitted from the base station SeNB.

FIG. 5 shows a diagram indicating the number of candidates of PDCCHes for which decoding is tried when PDCCH is used. As shown in the figure, as to the CSS, there are 4 candidates when aggregation level is 4, and there are 2 candidates when aggregation level is 8. In each case, since there are 2 types as possible DCI formats, total number of candidates is 12. By similar calculation, the number of candidates for the USS is 32 (when there is not UL MIMO), or 48 (where there is UL MIMO). Hereinafter, the number of candidates of BDs is referred to as the number of BDs. By the way, one time BD includes CRC descrambling at a position of assumed resources and CRC check and the like of DCI in an assumed DCI format.

FIG. 6 is a diagram showing the number of candidates for trying decoding when an EPDCCH is used. Since the EPDCCH is a UE-specific control signal, it is not transmitted by CSS, so that only USS is defined. As shown in FIG. 6, the number of BDs is 32 or 48. In the EPDCCH, although Localized mapping and Distributed mapping are defined, the example of FIG. 6 shows an example in the Distributed mapping.

As shown in FIG. 4, in dual connectivity, when CSS is supported in the SCell, the number of BDs increases by that. That is, as shown in FIG. 7, in CA of Rel-11, since RAR mapped to a CSS is not transmitted in an Scell, the number of BDs at the part is 0. On the other hand, when the CSS is supported in the Scell in dual connectivity, the number of BDs increases by 12 for detecting an RAR mapped to a CSS transmitted from the base station SeNB.

When the number of BDs increases, battery consumption of the user apparatus UE increases, and the number of decodings performed by the user apparatus UE per a unit time increases, so that implementation of the user apparatus UE becomes complicated and the number of False alarms increases.

The present invention is contrived in view of the above-mentioned points, and an object of the present invention is to provide a technique for decreasing the number of candidates that become targets of blind decoding performed when receiving control information transmitted by a downlink control channel in a user apparatus.

Means for Solving the Problems

According to an embodiment of the present invention, there is provided a user apparatus that communicates with a base station in a mobile communication system, including:

a reception unit configured to receive a radio signal from the base station by a downlink control channel; and a control information detection unit configured to detect control information, addressed to the user apparatus, mapped to a predetermined area in a time frequency resource of the downlink control channel by performing blind decoding in a plurality of candidate areas which are candidates of the predetermined area, wherein, when the user apparatus performs a random access procedure, the control information detection unit performs the blind decoding in areas in which a part of areas is excluded from the plurality of candidate areas.

According to an embodiment of the present invention, there is provided a user apparatus that communicates with a base station in a mobile communication system, including:

a reception unit configured to receive a radio signal from the base station by a downlink control channel; and a control information detection unit configured to detect control information, addressed to the user apparatus, mapped to a predetermined area in a time frequency resource of the downlink control channel by performing blind decoding in a plurality of candidate areas which are candidates of the predetermined area, wherein, when there are a plurality of format candidates of the control information and when the user apparatus performs a random access procedure, the control information detection unit performs the blind decoding by assuming formats in which a part of candidates is excluded from the plurality of format candidates.

According to an embodiment of the present invention, there is provided a base station that performs communication with a user apparatus in a mobile communication system, including:

a mapping unit configured to map control information, addressed to the user apparatus, to a predetermined area in a time frequency resource of a downlink control channel; and a transmission unit configured to transmit the control information, as a radio signal, by a downlink control channel using a time frequency resource of the predetermined area, wherein the predetermined area is an area among a plurality of candidate areas where blind decoding is performed for detecting the control information in the user apparatus, and wherein, when the user apparatus performs a random access procedure, the mapping unit selects the predetermined area from among areas in which a part of area is excluded from the plurality of candidate areas.

According to an embodiment of the present invention, there is provided a base station that performs communication with a user apparatus in a mobile communication system, including:

a control information generation unit configured to generate control information addressed to the user apparatus by using one format in a plurality of predetermined formats;

a mapping unit configured to map the control information, addressed to the user apparatus, to a predetermined area in a time frequency resource of a downlink control channel; and a transmission unit configured to transmit the control information, as a radio signal, by a downlink control channel using a time frequency resource of the predetermined area, wherein, when the user apparatus performs a random access procedure, the control information generation unit selects the one format from among formats in which a part of formats is excluded from the plurality of formats.

According to an embodiment of the present invention, there is provided a control information detection method executed by a user apparatus that communicates with a base station in a mobile communication system, including:

a reception step of receiving a radio signal from the base station by a downlink control channel; and a control information detection step of detecting control information, addressed to the user apparatus, mapped to a predetermined area in a time frequency resource of the downlink control channel by performing blind decoding in a plurality of candidate areas which are candidates of the predetermined area, wherein, when the user apparatus performs a random access procedure, the user apparatus performs the blind decoding in areas in which a part of areas is excluded from the plurality of candidate areas in the control information detection step.

According to an embodiment of the present invention, there is provided a control information detection method executed by a user apparatus that communicates with a base station in a mobile communication system, including:

a reception step of receiving a radio signal from the base station by a downlink control channel; and a control information detection step of detecting control information, addressed to the user apparatus, mapped to a predetermined area in a time frequency resource of the downlink control channel by performing blind decoding in a plurality of candidate areas which are candidates of the predetermined area, wherein, when there are a plurality of format candidates of the control information and when the user apparatus performs a random access procedure, the user apparatus performs the blind decoding by assuming formats in which a part of candidates is excluded from the plurality of format candidates in the control information detection step.

Effect of the Present Invention

According to an embodiment of the present invention, it becomes possible to decrease the number of candidates that become targets of blind decoding performed when receiving control information transmitted by a downlink control channel in a user apparatus.

BRIEF DESCRIPTION OF THE DRAWINGS

FIG. 5 is a diagram showing the number of candidates of PDCCH for which decoding is tried when using PDCCH;
FIG. 6 is a diagram showing the number of candidates for which decoding is tried when using EPDCCH;
FIG. 7 is a diagram indicating the number of BDs in CA of Rel-11 and Dual connectivity.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below.

(System Whole Configuration, and Outline of Embodiment)

Figure 1:
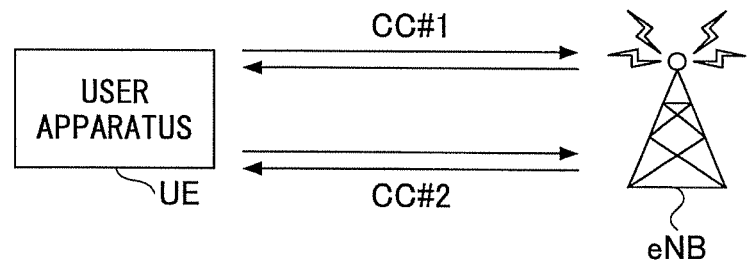
FIG. 1 is a diagram showing CA up to Rel-10.
Figure 2:
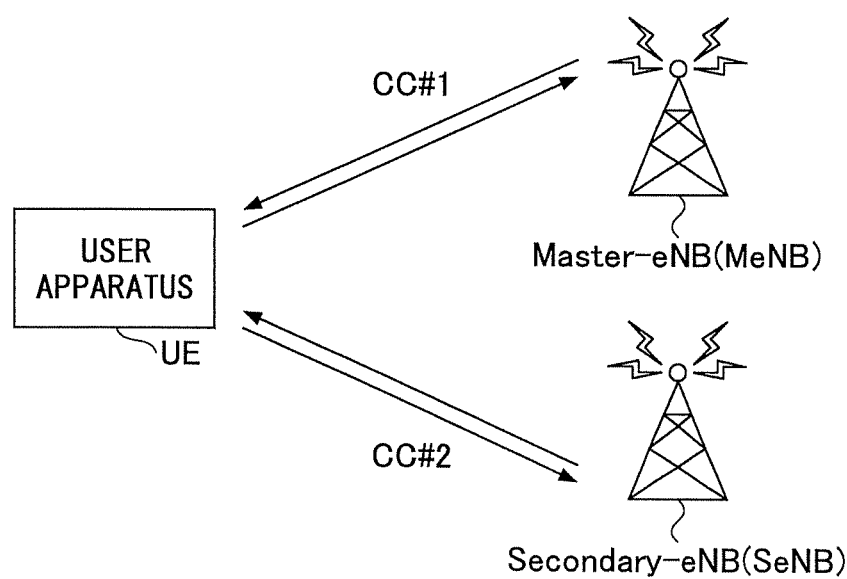
FIG. 2 is a diagram showing an example of Dual connectivity.
Figure 8:
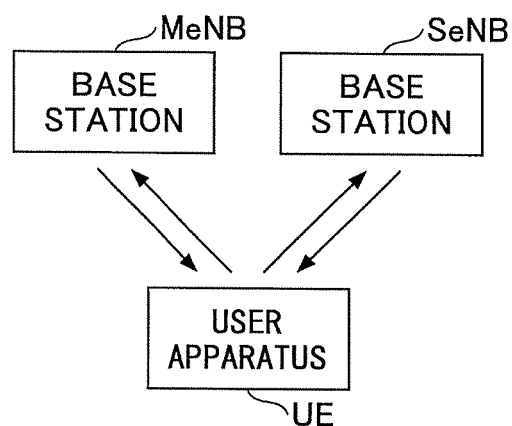
FIG. 8 is a block diagram of a mobile communication system in an embodiment of the present invention.

FIG. 8 shows a configuration example of a mobile communication system of an embodiment of the present invention. As shown in FIG. 8, the mobile communication system of the present embodiment is a system similar to the mobile communication system shown in FIG. 2, and includes a base station MeNB forming a Pcell, and a base station SeNB forming an Scell so as to provide a radio communication service of dual connectivity to the user apparatus UE. In the present embodiment, description is provided assuming that the user apparatus UE does not support UL MIMO. However, this is merely an example, and the technique of the present invention can be applied to a case where the user apparatus UE supports UL MIMO. Also, it is assumed that the mobile communication system (user apparatus and base station) of the present embodiment includes functions defined in Rel-12 of LTE as basic functions. However, the present invention can be applied to other communication schemes.

Figure 3:
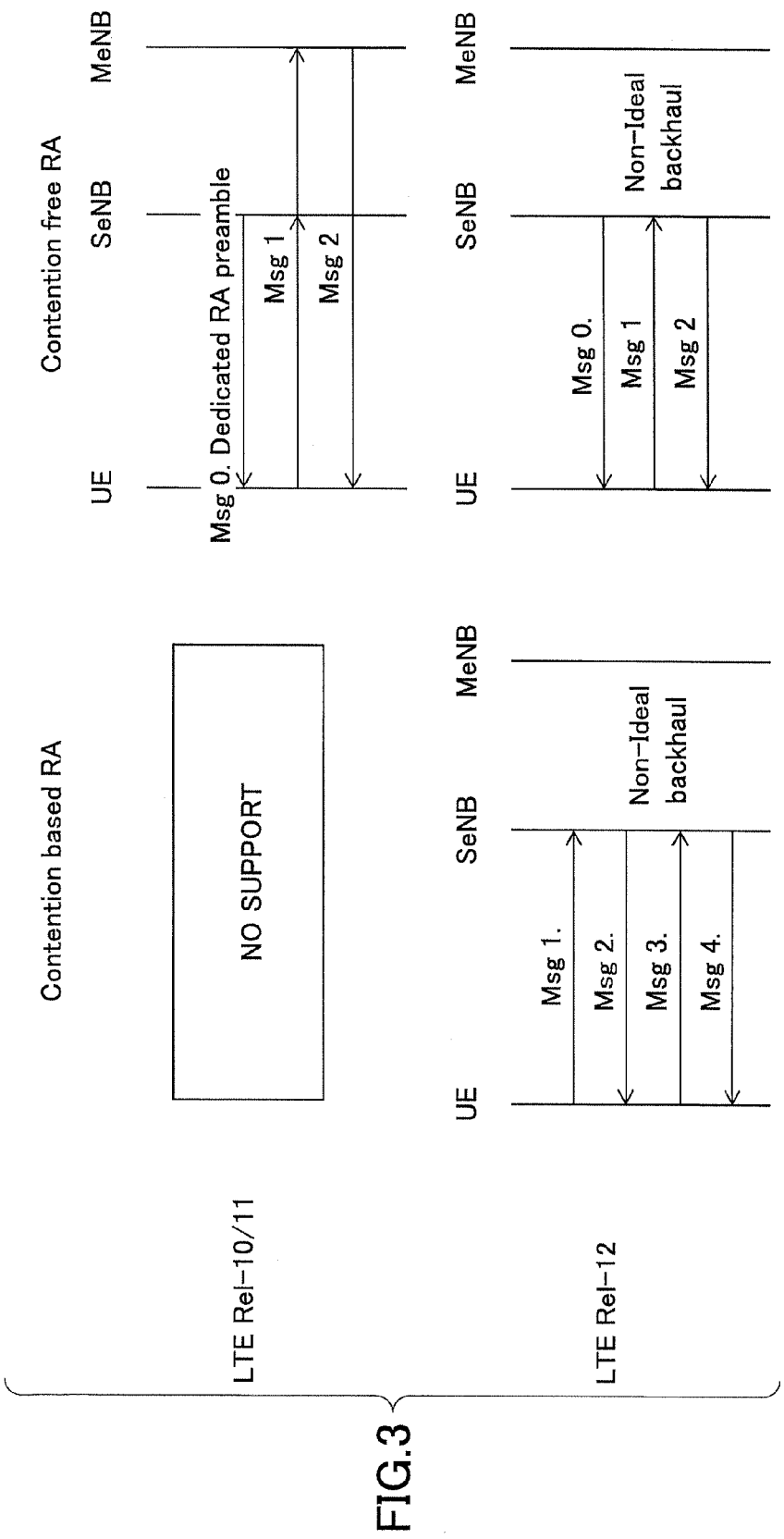
FIG. 3 is a diagram showing an RA procedure of Dual connectivity.
Figure 4:
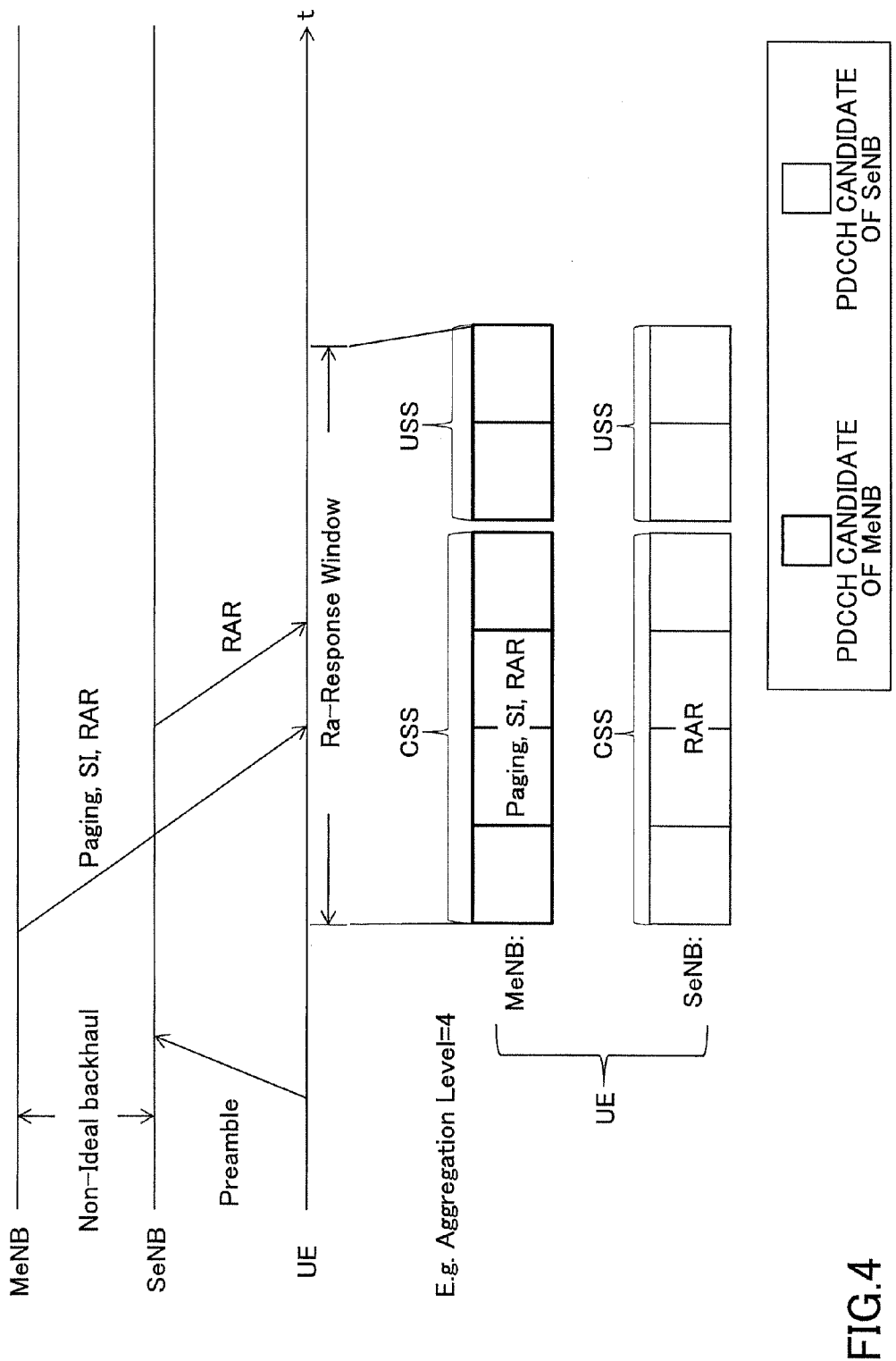
FIG. 4 is a diagram showing an example of PDCCH that the user apparatus UE receives.

The base station SeNB in the mobile communication system in the present embodiment supports the RA procedure as shown in the lower part of FIG. 3. That is, in either Contention based RA or Contention free RA, the user apparatus UE receives an RAR from the base station SeNB. Therefore, the user apparatus UE performs BD in a CSS of a PDCCH received from the base station SeNB. As described before, in this case, the number of BDs increases, so that a problem of consumed power increase and the like occurs. In the present embodiment, in order to solve this problem, the number of BDs is decreased to that of CA of Rel-11. By the way, in the following, "PDCCH" is used as a term including meaning of "EPDCCH" unless it is described as distinguished from EPDCCH.

In the following, as a method for this reduction, a method for restricting the number of candidates of a PDCCH for performing BDs is described as a first embodiment, and a method for restricting the number of DCI formats is described as a second embodiment. To restrict the number of candidates of a PDCCH is to restrict the number of candidates of resources to which a PDCCH to the user apparatus UE may be mapped.

First Embodiment

As mentioned above, in the first embodiment, the number of candidates of a PDCCH is restricted. As methods for that, embodiments 1-1, 1-2, and 1-3 are described. The embodiment 1-1 is a method for restricting the number of PDCCH candidates in a USS of the base station MeNB. The embodiment 1-2 is a method for restricting the number of PDCCH candidates in a USS of the base station SeNB. The embodiment 1-3 is a method for restricting the number of PDCCH candidates in a CSS of the base station MeNB and the the base station SeNB.

<Embodiment 1-1>

Figure 9:
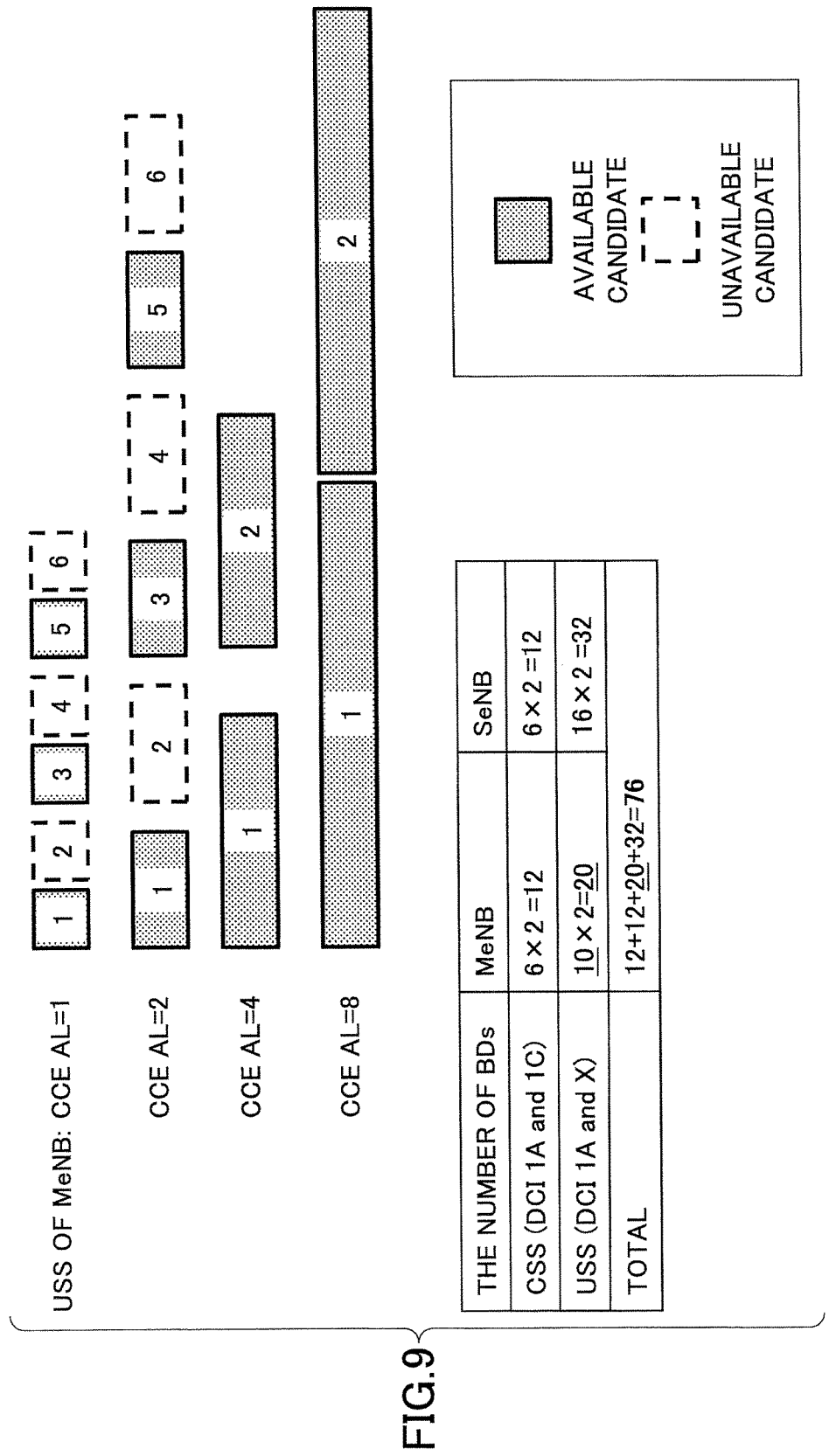
FIG. 9 is a diagram showing an example of a restriction method for PDCCH.

First, the embodiment 1-1 is described. As described above, in the embodiment 1-1, the number of PDCCH candidates in a USS of the base station MeNB is restricted. FIG. 9 shows an example of a restriction method for PDCCH. In the example shown in FIG. 9, the number of candidates which is 6 in Aggregation level=1 is restricted to 3, and the number of candidates which is 6 in Aggregation level=2 is restricted to 3.

In FIG. 9, the original number of candidates 6 in Aggregation level=1, the original number of candidates 6 in Aggregation level=2, the original number of candidates 2 in Aggregation level=4, and the original number of candidates 2 in Aggregation level=8 are the numbers of candidates defined in the standard in LTE respectively.

By restricting in this way, the number of PDCCH candidates in the USS of the base station MeNB becomes 10. Since the number of candidates of a DCI format is 2, the number of BDs in the USS of the base station MeNB becomes 20. Since the number of BDs in the USS of the base station MeNB is 32 when such a restriction is not performed, 12 of BDs are reduced. That is, reduction for the CSS of the base station SeNB is performed.

Figure 10:
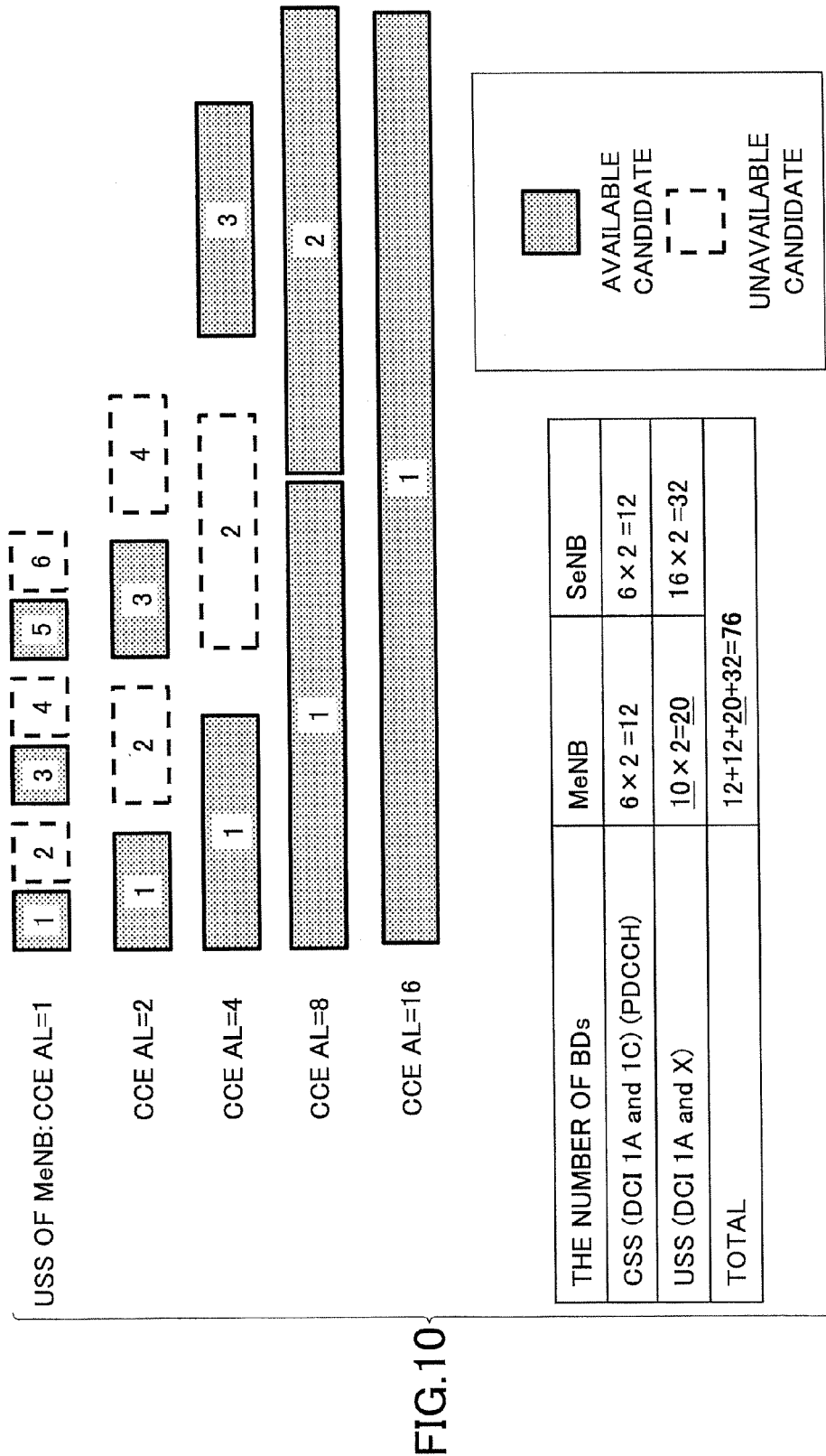
FIG. 10 is a diagram showing an example of a restriction method for EPDCCH.

FIG. 10 shows an example of a restriction method for EPDCCH. In the example shown in FIG. 10, the number of candidates which is 6 in Aggregation level=1 is restricted to 3, the number of candidates which is 4 in Aggregation level=2 is restricted to 2, and the number of candidates which is 3 in Aggregation level=4 is restricted to 2.

In FIG. 10, the original number of candidates 6 in Aggregation level=1, the original number of candidates 4 in Aggregation level=2, the original number of candidates 3 in Aggregation level=4, the original number of candidates 2 in Aggregation level=8, and the original number of candidates 1 in Aggregation level=16 are the numbers of candidates defined in the standard in LTE respectively.

By restricting in this way, the number of EPDCCH candidates in the USS of the base station MeNB becomes 10. Since the number of candidates of a DCI format is 2, the number of BDs in the USS of the base station MeNB becomes 20. Since the number of BDs in the USS of the base station MeNB is 32 when such a restriction is not performed, 12 of BDs are reduced. That is, reduction for the CSS of the base station SeNB is performed.

Figure 11:
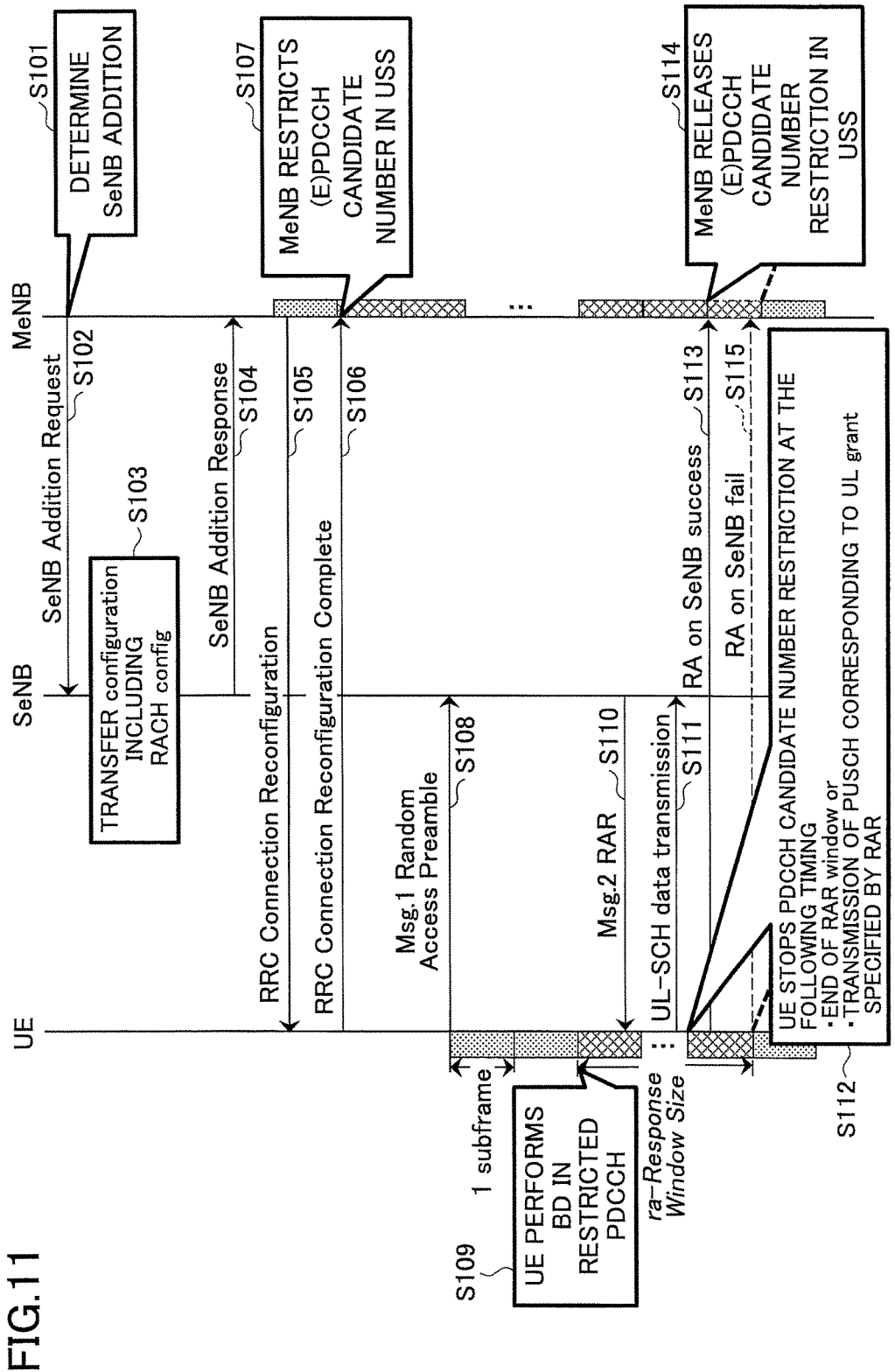
FIG. 11 is a sequence example in an embodiment 1-1.

FIG. 11 shows a sequence example in the embodiment 1-1. When the base station MeNB determines to add a resource of the base station SeNB (step 101), the base station MeNB transmits an SeNB Addition Request to the base station SeNB (step 102). The base station SeNB that receives the SeNB Addition Request determines to provide a configuration including a RACH config (step 103) so as to transmit an SeNB Addition Response including the configuration to the base station MeNB (step 104).

The base station MeNB that receives the SeNB Addition Response transmits, to the user apparatus UE, an RRC Connection Reconfiguration (RRC connection re-setting) including control information for SeNB addition (step 105), and the user apparatus UE returns an RRC Connection Reconfiguration Complete (RRC connection re-setting complete) to the base station MeNB (step 106). The base station MeNB that receives the RRC Connection Reconfiguration Complete recognizes that the base station SeNB is added to the communication with the user apparatus UE. Thus, since there is a possibility that an RA procedure between the base station SeNB and the user apparatus UE is performed, the base station MeNB restricts the number of (E)PDCCH candidates in the USS from this time point (example: FIG. 9 and FIG. 10). During this period of restriction, a (E)PDCCH for the user apparatus UE is not mapped to a resource that is not used due to restriction. That is, from this time point, a period during which it is estimated that the user apparatus UE monitors an RAR starts.

When a Random Access Preamble (message 1) is transmitted from the user apparatus UE to the base station SeNB (step 108), an ra-Response Window period for waiting for (monitoring) an RAR starts after a predetermined period (2 subframes), so that the user apparatus UE starts the reduced number of BDs from the start of the period (step 109). That is, although the user apparatus UE receives PDCCHs from the base station SeNB and the base station MeNB, the user apparatus UE performs BDs on restricted resource candidates as shown in FIG. 9 and FIG. 10 for the USS of the PDCCH received from the base station MeNB.

The user apparatus UE receives the RAR (message 2) (step 110), so as to perform UL-SCH data transmission (uplink data transmission) based on the assignment information (step 111). Then, when the user apparatus UE succeeds the RA procedure with the base station SeNB, the user apparatus UE transmits an RA on SeNB success to the base station MeNB (step 113). The base station MeNB that receives the RA on SeNB success recognizes that RAR transmission from the base station SeNB to the user apparatus UE ends to release the (E)PDCCH candidate number restriction in the USS (step 114). When the RA procedure with the base station SeNB fails, the user apparatus UE transmits an RA on SeNB fail to the base station MeNB (step 115). The base station MeNB that receives the RA on SeNB fail recognizes that RAR transmission from the base station SeNB to the user apparatus UE ends, and the base station MeNB releases (E)PDCCH candidate number restriction in the USS (step 114). Steps 113 and 114 mean end of the period during which it is estimated that the user apparatus UE monitors an RAR.

On the other hand, the user apparatus UE stops (E)PD-CCH candidate number restriction in the USS of the base station MeNB (step 112) at a timing when the ra-Response Window period ends in the user apparatus UE or a timing when PUSCH transmission (the above-mentioned UL-SCH data transmission) corresponding to an UL grant specified by the RAR is performed in the user apparatus UE.

<Embodiment 1-2>

Figure 12:
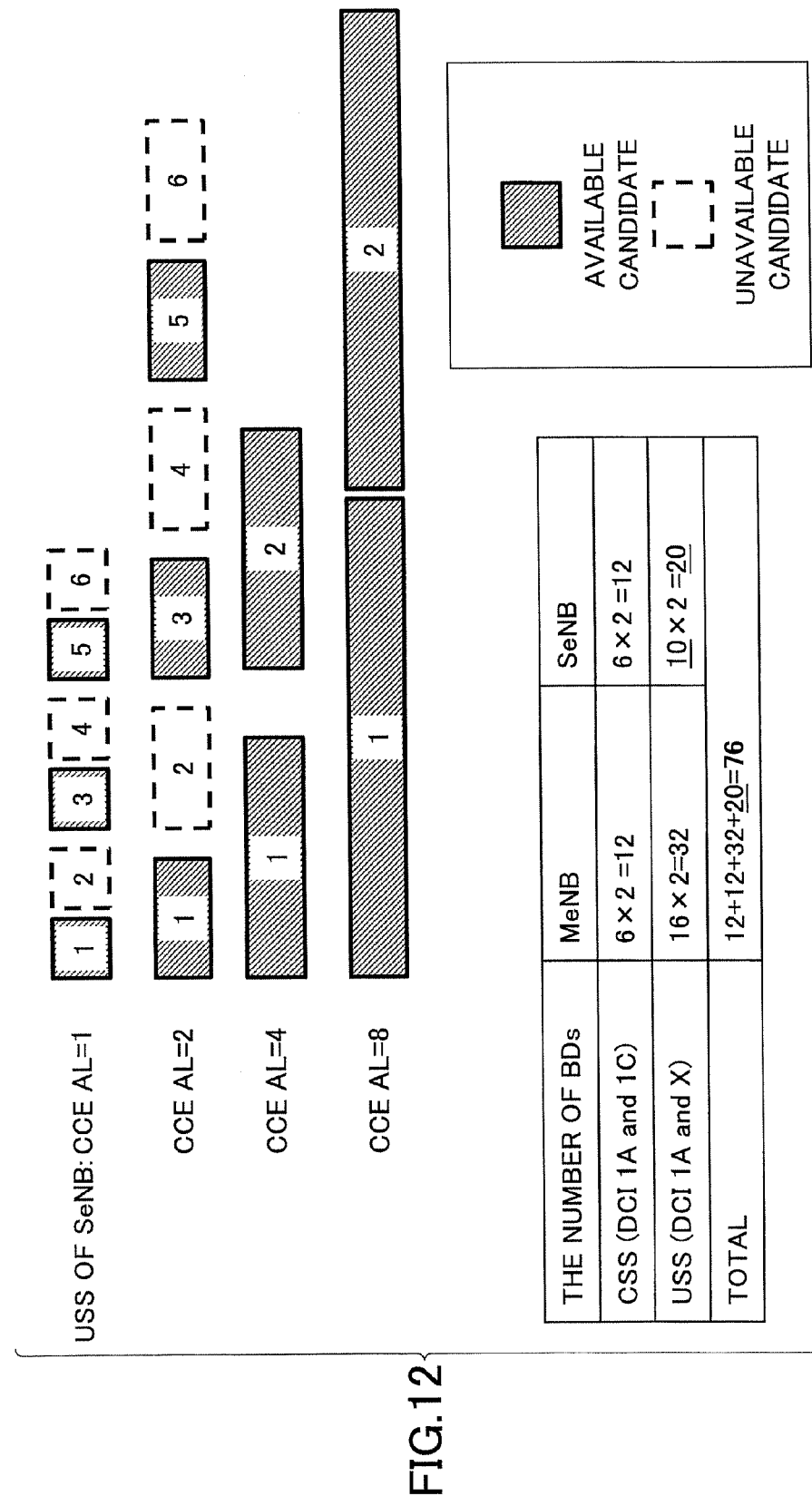
FIG. 12 is a diagram showing an example of a restriction method for PDCCH.

Next, the embodiment 1-2 is described. As described before, in the embodiment 1-2, the number of PDCCH candidates in a USS of the base station SeNB is restricted. FIG. 12 shows an example of a restriction method for PDCCH. In the example shown in FIG. 12, the number of candidates which is 6 in Aggregation level=1 is restricted to 3, and the number of candidates which is 6 in Aggregation level=2 is restricted to 3.

By restricting in this way, the number of PDCCH candidates in the USS of the base station SeNB becomes 10. Since the number of candidates of a DCI format is 2, the number of BDs in the USS of the base station SeNB becomes 20. Since the number of BDs in the USS of the base station SeNB is 32 when such a restriction is not performed, 12 of BDs are reduced. That is, reduction for the CSS of the base station SeNB is performed.

Figure 13:
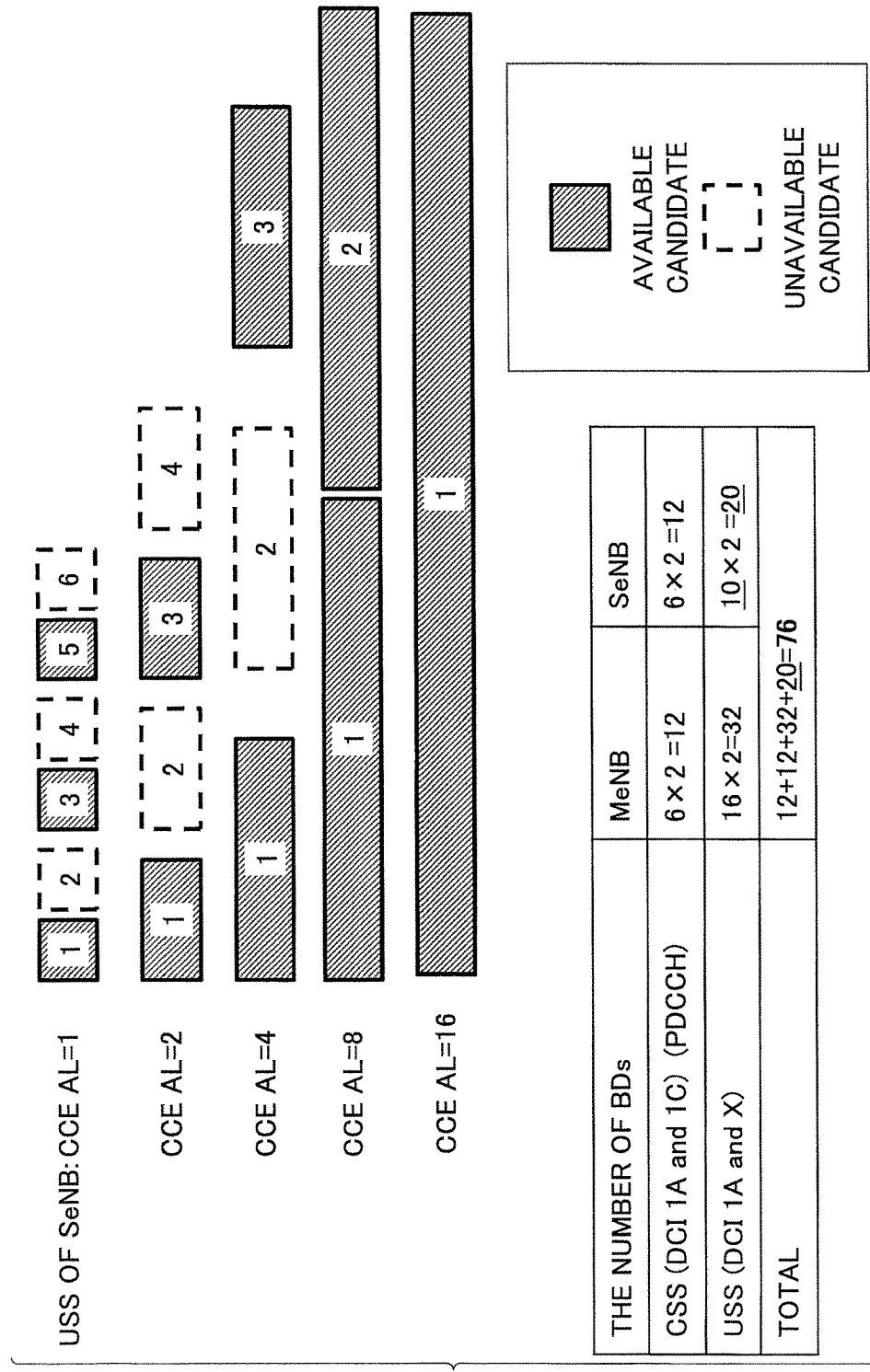
FIG. 13 is a diagram showing an example of a restriction method for EPDCCH.

FIG. 13 shows an example of a restriction method for EPDCCH. In the example shown in FIG. 13, the number of candidates which is 6 in Aggregation level=1 is restricted to 3, the number of candidates which is 4 in Aggregation level=2 is restricted to 2, and the number of candidates which is 3 in Aggregation level=4 is restricted to 2.

By restricting in this way, the number of EPDCCH candidates in the USS of the base station SeNB becomes 10. Since the number of candidates of a DCI format is 2, the number of BDs in the USS of the base station SeNB becomes 20. Since the number of BDs in the USS of the base station SeNB is 32 when such a restriction is not performed, 12 of BDs are reduced. That is, reduction for the CSS of the base station SeNB is performed.

Figure 14:
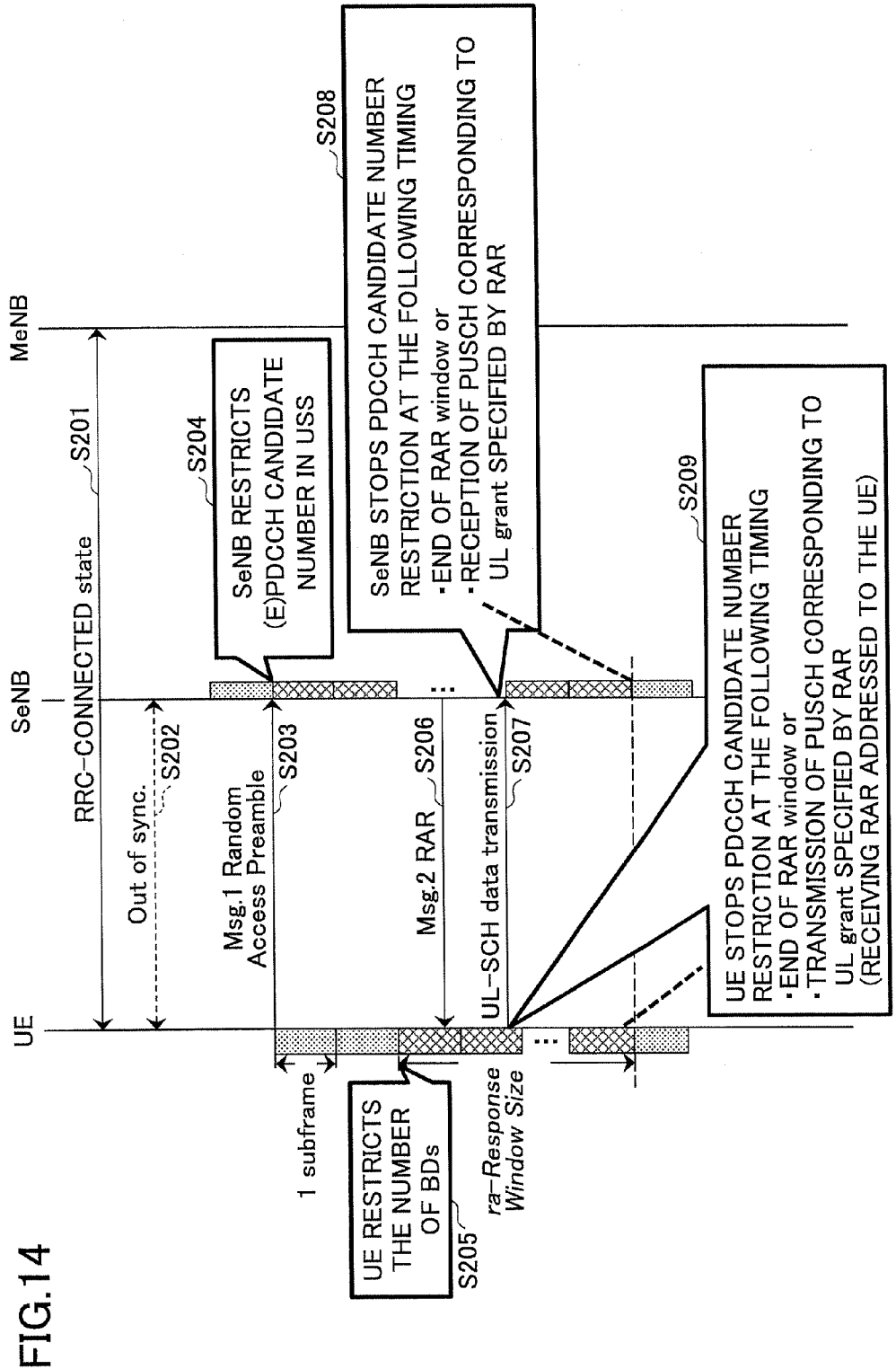
FIG. 14 is a sequence example in an embodiment 1-2.

FIG. 14 shows a sequence example in the embodiment 1-2. In this example, first, the user apparatus UE and the base station MeNB are in an RRC connected state (step 201). And also, the user apparatus UE and the base station SeNB are not connected, and are in a state of out of synchronization (step 202). Since the user apparatus UE and the base station MeNB are in an RRC connected state, the user apparatus UE monitors a PDCCH from the base station MeNB and performs BDs during the whole period shown in FIG. 14.

A Random Access Preamble (message 1) is transmitted from the user apparatus UE to the base station SeNB (step 203). Since the base station SeNB that receives the Random Access Preamble transmits an RAR by the CSS, the base station SeNB restricts the number of (E) PDCCH candidates from this time point (step 204). During this period of restriction, a (E)PDCCH for the user apparatus UE is not mapped to a resource that is not used due to restriction.

In the user apparatus UE, an ra-Response Window period for waiting for an RAR starts after a predetermined period (2 subframes) from the transmission of the Random Access Preamble, so that the user apparatus UE starts the reduced number of BDs from the start of the period (step 205). That is, although the user apparatus UE receives PDCCHs from the base station SeNB and the base station MeNB, the user apparatus UE performs BDs on restricted resource candidates as shown in FIG. 12 and FIG. 13 for the USS of the PDCCH received from the base station SeNB.

The user apparatus UE receives the RAR (message 2) (step 206), so as to perform UL-SCH data transmission (uplink data transmission) based on the assignment information (step 207). In the base station SeNB, when the ra-Response Window period ends, or when PUSCH reception corresponding to the UL grant specified by the RAR is performed, the base station SeNB releases (E) PDCCH candidate number restriction in the USS at that time point since RAR transmission is not performed after that.

On the other hand, the user apparatus UE stops BD based on (E)PDCCH candidate number restriction in the USS of the base station SeNB (step 209) at a timing when the ra-Response Window period ends in the user apparatus UE or a timing when PUSCH transmission (the above-mentioned UL-SCH data transmission) corresponding to an UL grant specified by the RAR is performed in the user apparatus UE (meaning that RAR addressed to the user apparatus UE is received).

<Embodiment 1-3>

Next, the embodiment 1-3 is described. As described before, in the embodiment 1-3, the number of PDCCH candidates in a CSS of the base station MeNB and the base station SeNB is restricted.

Figure 15:
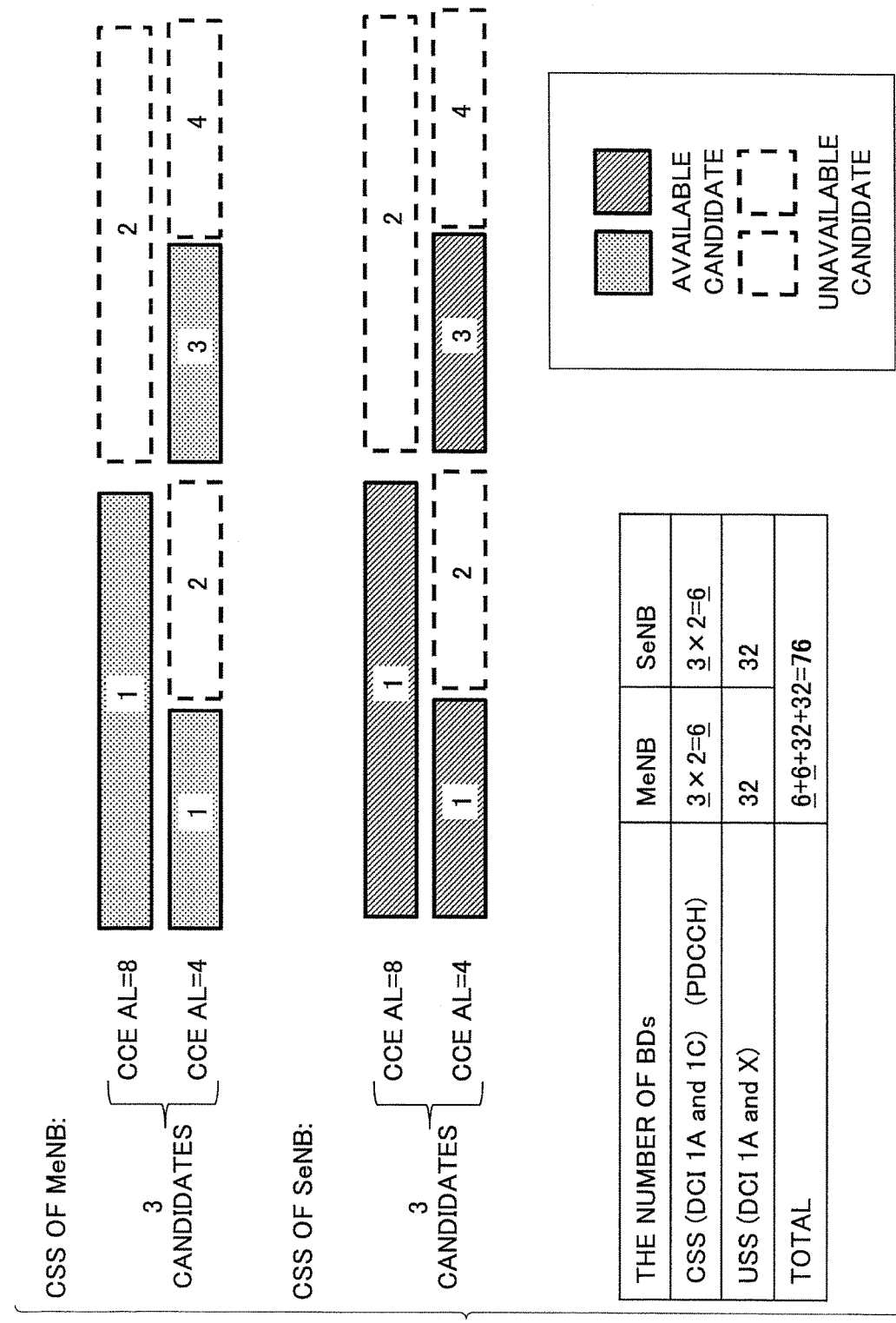
FIG. 15 is a diagram showing an example of a method for restricting the number of PDCCH candidates in a CSS of a base station MeNB and a base station SeNB.

FIG. 15 shows an example of a restriction method for PDCCH. In the example shown in FIG. 15, the number of candidates which is 2 in Aggregation level=8 is restricted to 1, and the number of candidates which is 4 in Aggregation level=4 is restricted to 2 in each CSS of the base station MeNB and the base station SeNB.

By restricting in this way, the number of PDCCH candidates in the CSS of the base station MeNB becomes 3. Since the number of candidates of a DCI format is 2, the number of BDs in the CSS of the base station MeNB becomes 6. Since the number of BDs in the CSS of the base station MeNB is 12 when such a restriction is not performed, 6 of BDs are reduced. Also, the number of PDCCH candidates in the CSS of the base station SeNB becomes 3. Since the number of candidates of a DCI format is 2, the number of BDs in the CSS of the base station SeNB becomes 6. Since the number of BDs in the CSS of the base station SeNB is 12 when such a restriction is not performed, 6 of BDs are reduced. Thus, 12 of BDs are reduced in total. That is, reduction for the CSS of the base station SeNB is performed.

Figure 16:
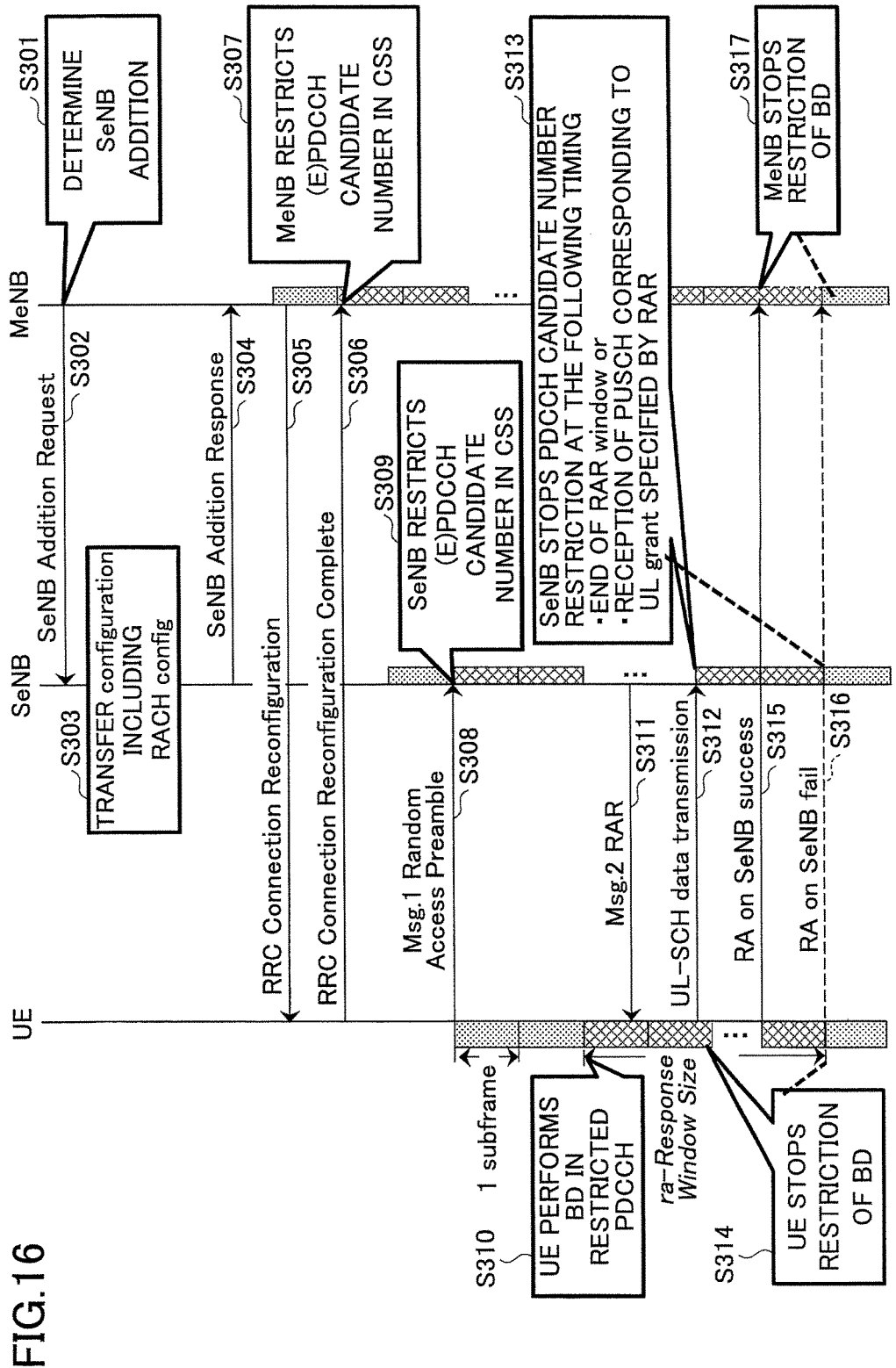
FIG. 16 is a sequence example in an embodiment 1-3.

FIG. 16 shows a sequence example in the embodiment 1-3. When the base station MeNB determines to add a resource of the base station SeNB (step 301), the base station MeNB transmits an SeNB Addition Request to the base station SeNB (step 302). The base station SeNB that receives the SeNB Addition Request determines to provide a configuration including a RACH config (step 303) so as to transmit an SeNB Addition Response including the configuration to the base station MeNB (step 304).

The base station MeNB that receives the SeNB Addition Response transmits, to the user apparatus UE, an RRC Connection Reconfiguration (RRC connection re-setting) including control information for SeNB addition (step 305), and the user apparatus UE returns an RRC Connection Reconfiguration Complete (RRC connection re-setting complete) to the base station MeNB (step 306). The base station MeNB that receives the RRC Connection Reconfiguration Complete recognizes that the base station SeNB is added to the communication with the user apparatus UE. Thus, since there is a possibility that an RA procedure between the base station SeNB and the user apparatus UE is performed, the base station MeNB restricts the number of (E)PDCCH candidates in the CSS from this time point (example: FIG. 15). During this period of restriction, a (E)PDCCH for the user apparatus UE is not mapped to a resource that is not used due to restriction.

A Random Access Preamble (message 1) is transmitted from the user apparatus UE to the base station SeNB (step 308). Since the base station SeNB that receives the Random Access Preamble transmits an RAR by the CSS, the base station SeNB restricts the number of (E)PDCCH candidates from this time point (step 309). During this period of restriction, a (E)PDCCH for the user apparatus UE is not mapped to a resource that is not used due to restriction.

In the user apparatus UE, an ra-Response Window period for waiting for an RAR starts after a predetermined period (2 subframes) from Random Access Preamble transmission, so that the user apparatus UE starts the reduced number of BDs from the start of the period (step 310). That is, the user apparatus UE performs BDs on restricted resource candidates as shown in FIG. 15 for the CSS of the PDCCH received from the base station SeNB and the base station MeNB.

The user apparatus UE receives the RAR (message 2) (step 311), so as to perform UL-SCH data transmission (uplink data transmission) based on the assignment information (step 312). In the base station SeNB, when the ra-Response Window period ends, or when PUSCH reception corresponding to the UL grant specified by the RAR is performed, the base station SeNB releases (E) PDCCH candidate number restriction in the CSS at that time point since RAR transmission is not performed after that (step 313).

On the other hand, the user apparatus UE stops BD based on (E)PDCCH candidate number restriction in the CSS of the base station SeNB (step 314) at a timing when the ra-Response Window period ends or a timing when PUSCH transmission (the above-mentioned UL-SCH data transmission) corresponding to an UL grant specified by the RAR is performed.

When the user apparatus UE succeeds the RA procedure with the base station SeNB, the user apparatus UE transmits an RA on SeNB success to the base station MeNB (step 315). The base station MeNB that receives the RA on SeNB success recognizes that RAR transmission from the base station SeNB to the user apparatus UE ends to release the (E)PDCCH candidate number restriction in the CSS (step 317). When the RA procedure with the base station SeNB fails, the user apparatus UE transmits an RA on SeNB fail to the base station MeNB (step 316). The base station MeNB that receives the RA on SeNB fail recognizes that RAR transmission from the base station SeNB to the user apparatus UE ends, and the base station MeNB releases (E)PDCCH candidate number restriction in the CSS (step 317).

Embodiments 1-1-1-3 may be carried out by combining them. Also, in the embodiments 1-1-1-3 described so far, although an example is described in which PDCCH candidates of the even-numbered indexes are skipped, this is merely an example. PDCCH candidates for skipping are not limited to this. For example, PDCCH candidates for skipping may be a predetermined number of candidates from the smallest PDCCH candidate index. This is an example for skipping 0~2 from 0~5, for example. Also, (the largest value of PDCCH candidate index) mod.2~ the largest value of PDCCH candidate index may be skipped. Also, a top PDCCH candidate index for skipping and the length (how many PDCCH candidates to skip) may be notified from the base station eNB. Also, when the user apparatus UE receives a notification that cannot be interpreted, the user apparatus UE may discard the notification. Further, skip patterns may be different for each aggregation level.

(Second Embodiment)

In the second embodiment, the number of DCI formats of the PDCCH is restricted. As methods for that, embodiments 2-1, 2-2, and 2-3 are described. The embodiment 2-1 is a method for restricting the number of DCI formats in a USS of the base station MeNB. The embodiment 2-2 is a method for restricting the number of DCI formats in a USS of the base station SeNB. The embodiment 2-3 is a method for restricting the number of DCI formats in a CSS of the base station MeNB and the the base station SeNB.

<Embodiment 2-1>

Figure 17:
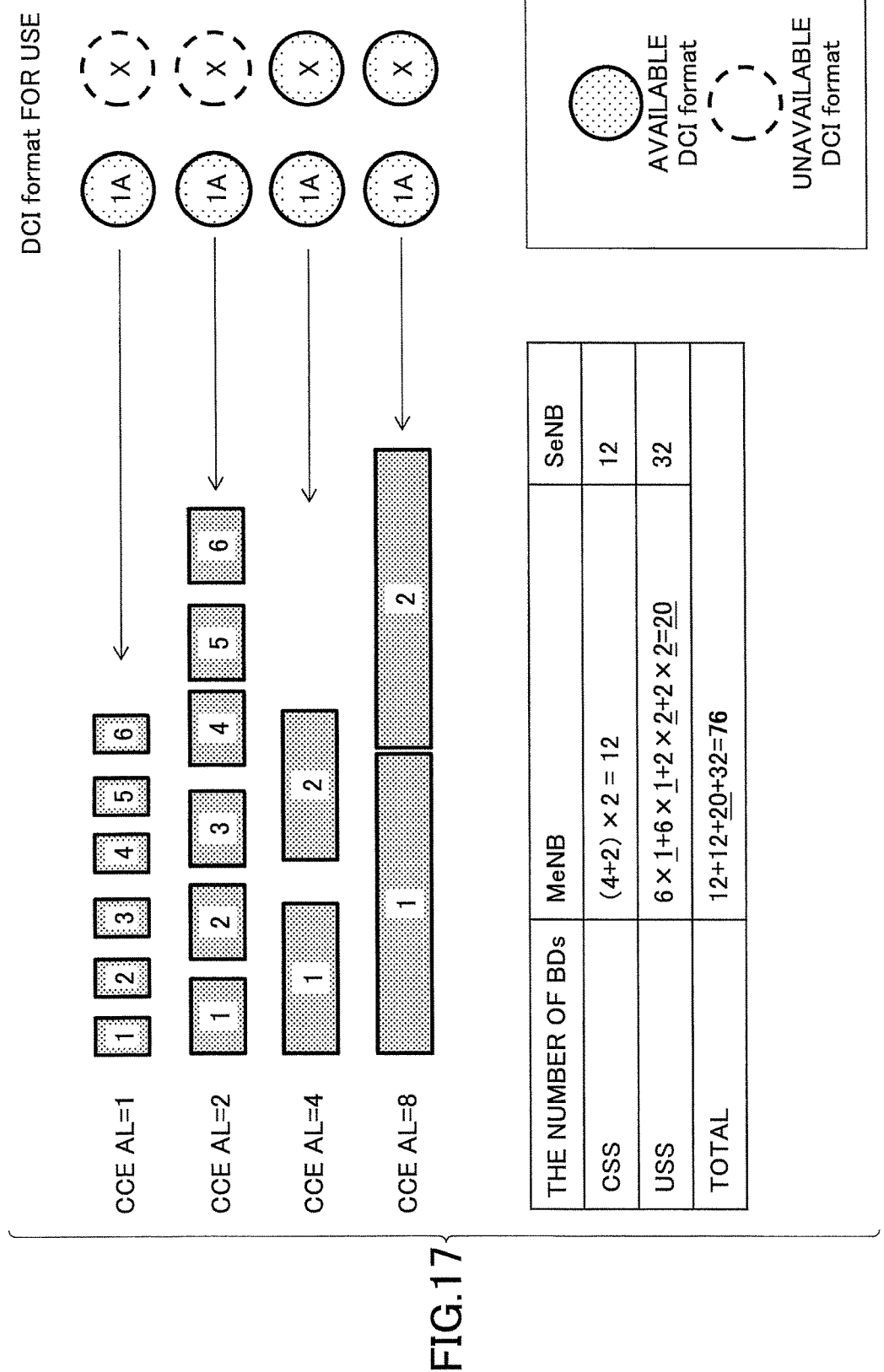
FIG. 17 is a diagram showing an example of a restriction method for PDCCH.

First, the embodiment 2-1 is described. As described above, in the embodiment 2-1, the number of DCI formats of the base station MeNB is restricted. FIG. 17 shows an example of a restriction method for PDCCH. In the example shown in FIG. 17, the number of DCI formats in Aggregation level=1 is restricted to 1, and the number of DCI formats in Aggregation level=2 is restricted to 1. In this example, DCI format 1A is remained in each case.

By restricting in this way, the number of BDs in the USS of the base station MeNB becomes 20. Since the number of BDs in the USS of the base station MeNB is 32 when such a restriction is not performed, 12 of BDs are reduced. That is, reduction for the CSS of the base station SeNB is performed.

Figure 18:
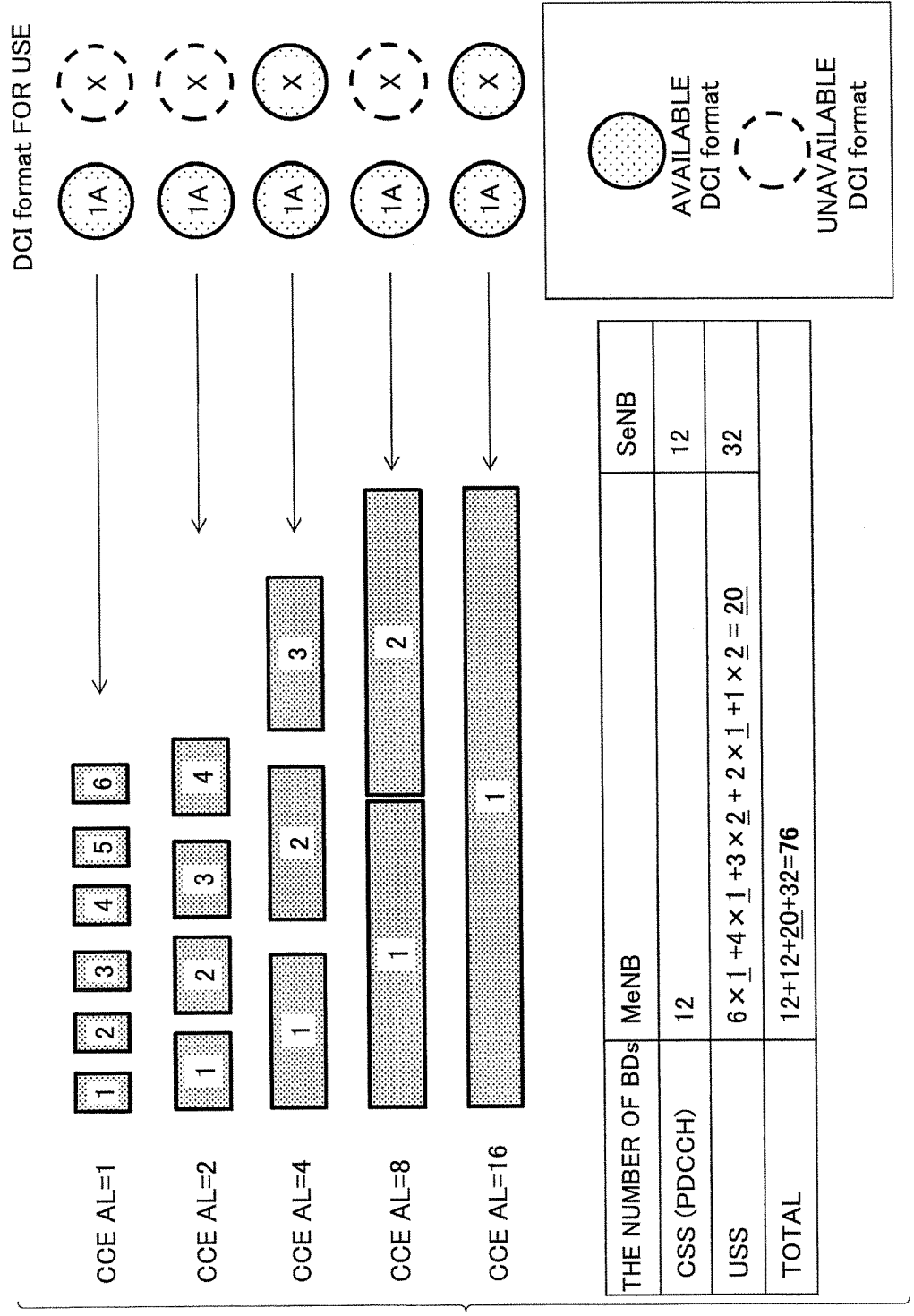
FIG. 18 is a diagram showing an example of a restriction, method for EPDCCH.

FIG. 18 shows an example of a restriction method for EPDCCH. In the example shown in FIG. 18, the number of DCI formats in Aggregation level=1 is restricted to 1, the number of DCI formats in Aggregation level=2 is restricted to 1, and the number of DCI formats in Aggregation level=8 is restricted to 1. DCI format 1A is remained in either case.

By restricting in this way, the number of BDs in the USS of the base station MeNB becomes 20. Since the number of BDs in the USS of the base station MeNB is 32 when such a restriction is not performed, 12 of BDs are reduced. That is, reduction for the CSS of the base station SeNB is performed.

Figure 19:
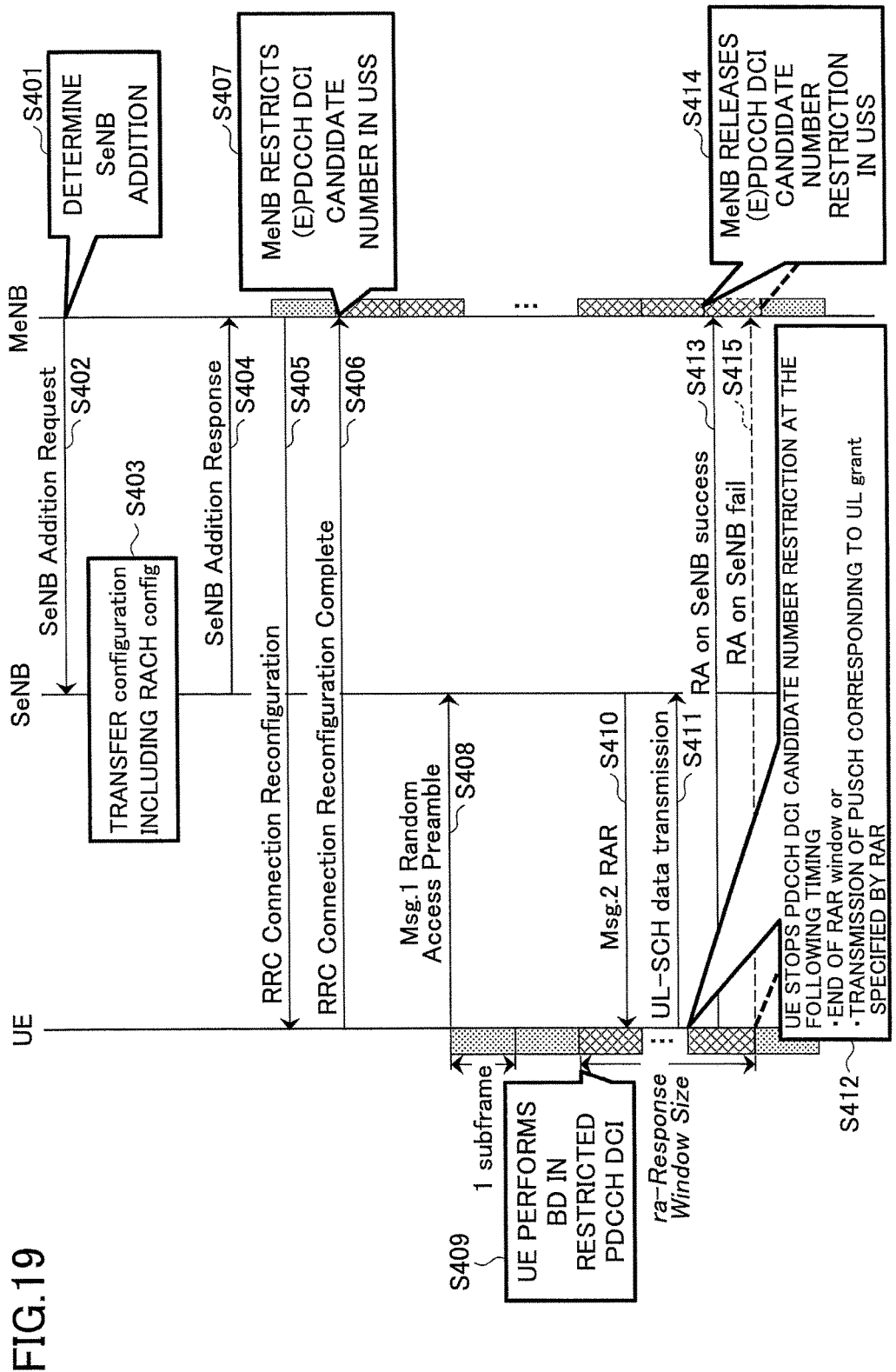
FIG. 19 is a sequence example in an embodiment 2-1.

FIG. 19 shows a sequence example in the embodiment 2-1. When the base station MeNB determines to add a resource of the base station SeNB (step 401), the base station MeNB transmits an SeNB Addition Request to the base station SeNB (step 402). The base station SeNB that receives the SeNB Addition Request determines to provide a configuration including a RACH config (step 403) so as to transmit an SeNB Addition Response including the configuration to the base station MeNB (step 404).

The base station MeNB that receives the SeNB Addition Response transmits, to the user apparatus UE, an RRC Connection Reconfiguration (RRC connection re-setting) including control information for SeNB addition (step 405), and the user apparatus UE returns an RRC Connection Reconfiguration Complete (RRC connection re-setting complete) to the base station MeNB (step 406). The base station MeNB that receives the RRC Connection Reconfiguration Complete recognizes that the base station SeNB is added to the communication with the user apparatus UE. Thus, since there is a possibility that an RA procedure between the base station SeNB and the user apparatus UE is performed, the base station MeNB restricts the number of (E)PDCCH DCI format candidates in the USS from this time point (example: FIG. 17 and FIG. 18). During this period of restriction, in the (E)PDCCH for the user apparatus UE, only DCI format(s) remaining by restriction is used.

When a Random Access Preamble (message 1) is transmitted from the user apparatus UE to the base station SeNB (step 408), an ra-Response Window period for waiting for an RAR starts after a predetermined period (2 subframes), so that the user apparatus UE starts the reduced number of BDs from the start of the period (step 409). That is, although the user apparatus UE receives PDCCHs from the base station SeNB and the base station MeNB, the user apparatus UE performs BDs on restricted candidates as shown in FIG. 17 and FIG. 18 for DCI formats of the PDCCH received from the base station MeNB.

The user apparatus UE receives the RAR (message 2) (step 410), so as to perform UL-SCH data transmission (uplink data transmission) based on the assignment information (step 411). Then, when the user apparatus UE succeeds the RA procedure with the base station SeNB, the user apparatus UE transmits an RA on SeNB success to the base station MeNB (step 413). The base station MeNB that receives the RA on SeNB success recognizes that RAR transmission from the base station SeNB to the user apparatus UE ends to release the (E)PDCCH DCI format candidate number restriction (step 414). When the RA procedure with the base station SeNB fails, the user apparatus UE transmits an RA on SeNB fail to the base station MeNB (step 415). The base station MeNB that receives the RA on SeNB fail recognizes that RAR transmission from the base station SeNB to the user apparatus UE ends, and the base station MeNB releases (E)PDCCH DCI format candidate number restriction (step 414).

On the other hand, the user apparatus UE stops (E)PDCCH DCI format candidate number restriction of the base station MeNB (step 412) at a timing when the ra-Response Window period ends or a timing when PUSCH transmission (the above-mentioned UL-SCH data transmission) corresponding to an UL grant specified by the RAR is performed.

<Embodiment 2-2>

Figure 20:
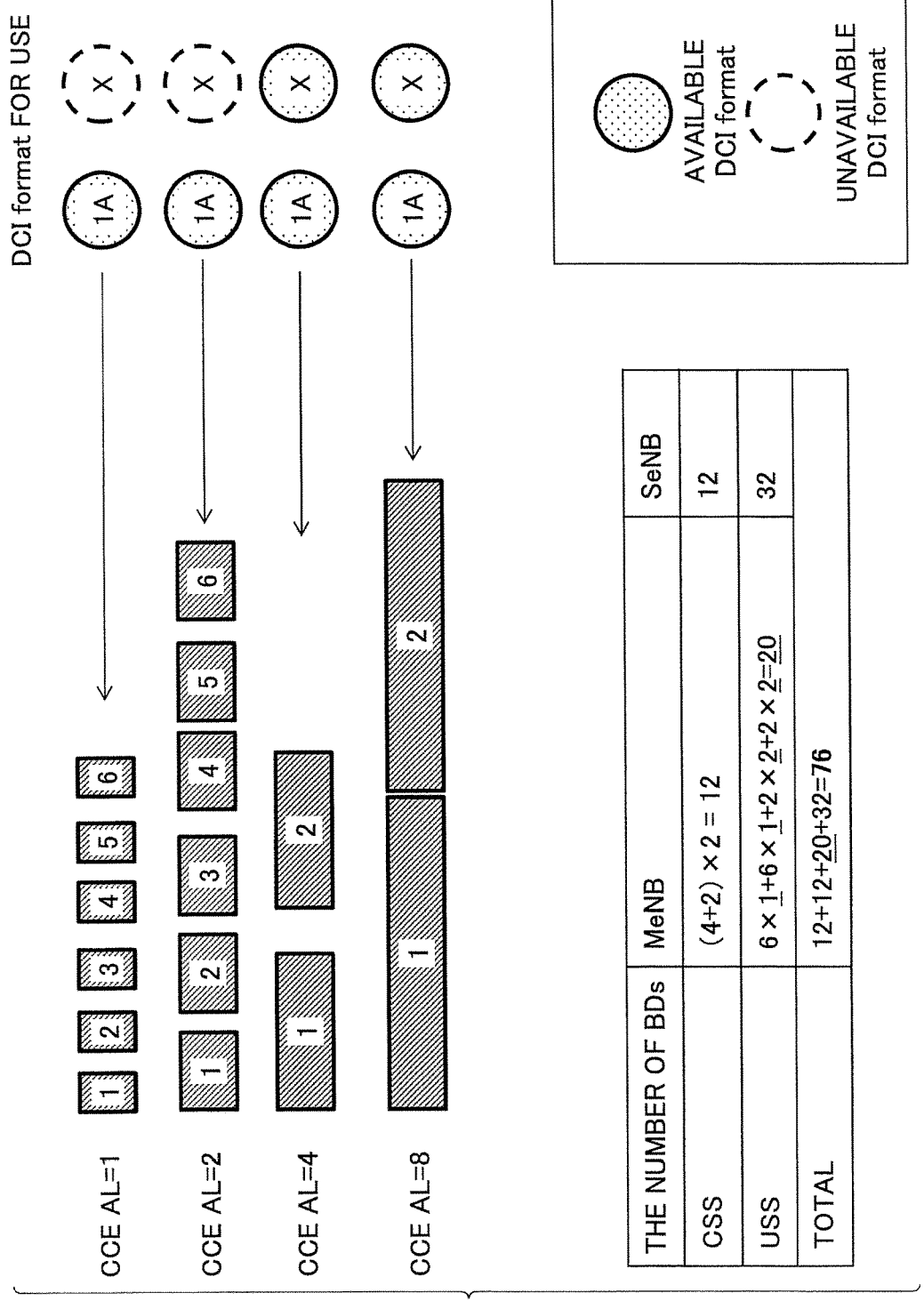
FIG. 20 is a diagram showing an example of a restriction method for PDCCH.

Next, the embodiment 2-2 is described. As described before, in the embodiment 2-2, the number of DCI formats in the base station SeNB is restricted. FIG. 20 shows an example of a restriction method for PDCCH. In the example shown in FIG. 20, the number of DCI format in Aggregation level=1 is restricted to 1, and the number of DCI format in Aggregation level=2 is restricted to 1. In each case, DCI format 1A is remained.

By restricting in this way, the number of BDs in the USS of the base station SeNB becomes 20. Since the number of BDs in the USS of the base station SeNB is 32 when such a restriction is not performed, 12 of BDs are reduced. That is, reduction for the CSS of the base station SeNB is performed.

Figure 21:
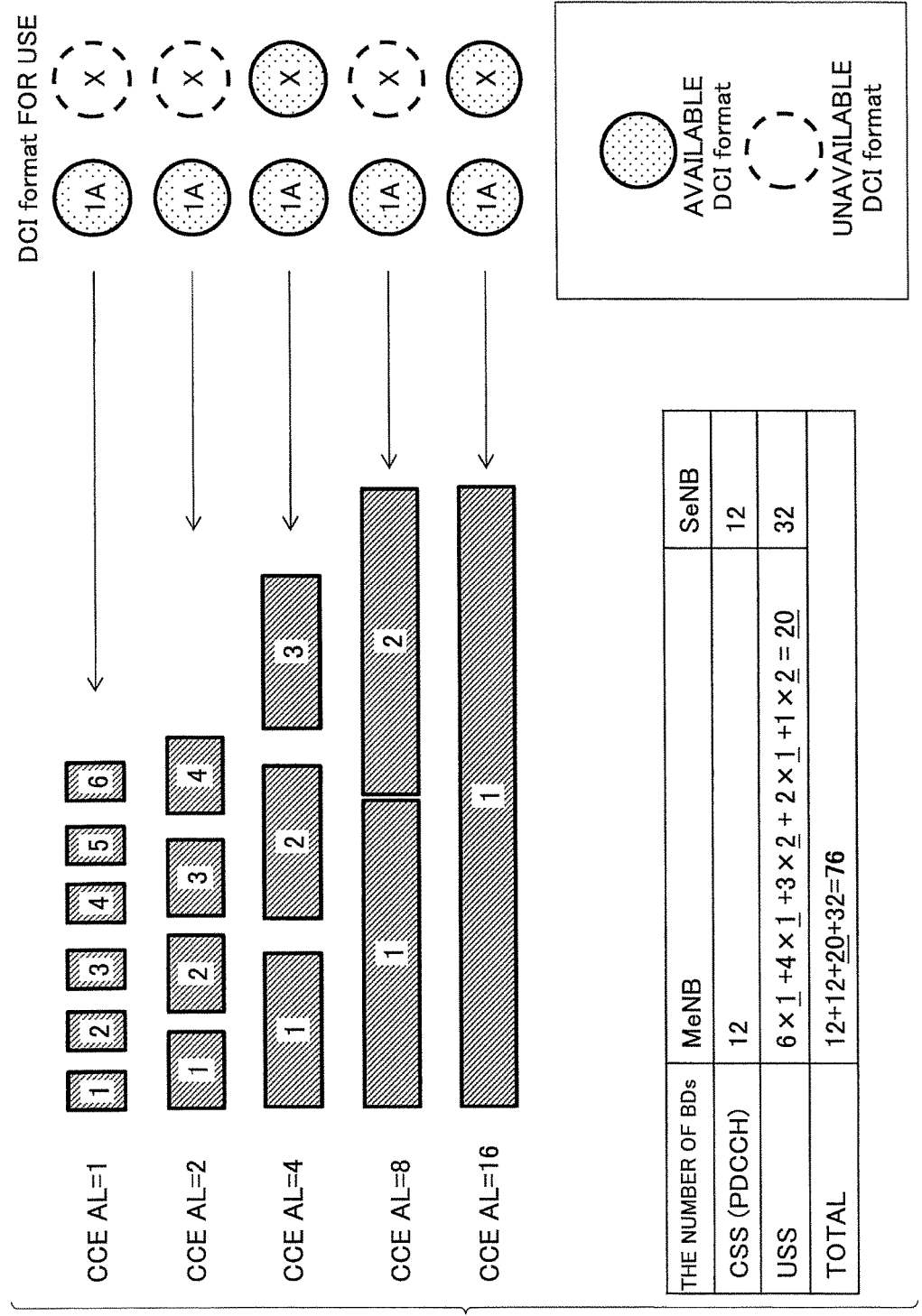
FIG. 21 is a diagram showing an example of a restriction method for EPDCCH.

FIG. 21 shows an example of a restriction method for EPDCCH. In the example shown in FIG. 21, the number of DCI formats in Aggregation level=1 is restricted to 1, the number of DCI formats in Aggregation level=2 is restricted to 1, and the number of DCI formats in Aggregation level=8 is restricted to 1. In each case, DCI format 1A is remained.

By restricting in this way, the number of BDs in the USS of the base station SeNB becomes 20. Since the number of BDs in the USS of the base station SeNB is 32 when such a restriction is not performed, 12 of BDs are reduced. That is, reduction for the CSS of the base station SeNB is performed.

Figure 22:
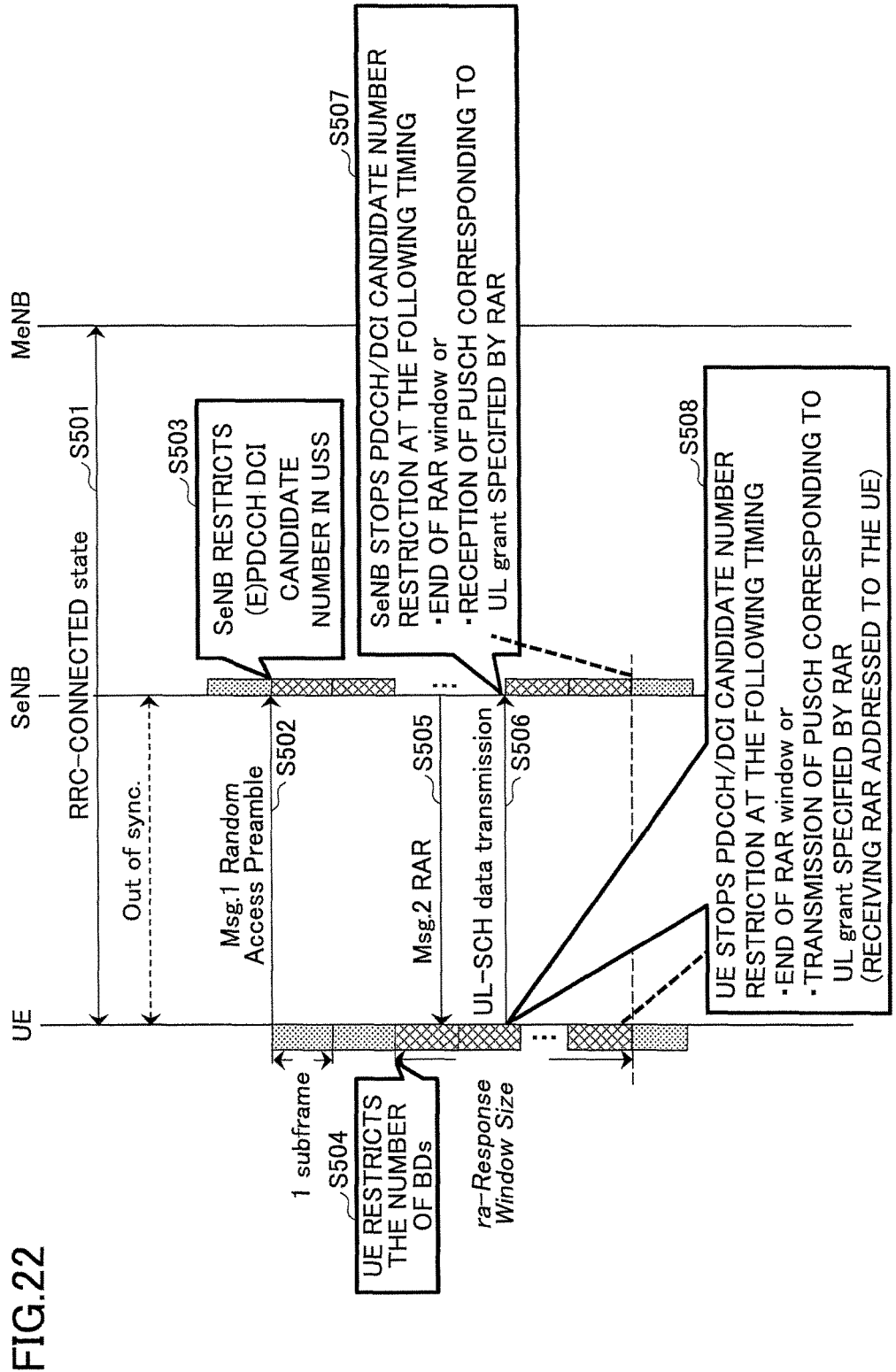
FIG. 22 is a sequence example in an embodiment 2-2.

FIG. 22 shows a sequence example in the embodiment 2-2. In this example, first, the user apparatus UE and the base station MeNB are in an RRC connected state (step 501). And also, the user apparatus UE and the base station SeNB are not connected, and are in a state of out of synchronization.

Since the user apparatus UE and the base station MeNB are in an RRC connected state, the user apparatus UE monitors a PDCCH from the base station MeNB and performs BDs during the whole period shown in FIG. 22.

A Random Access Preamble (message 1) is transmitted from the user apparatus UE to the base station SeNB (step 502). Since the base station SeNB that receives the Random Access Preamble transmits an RAR by the CSS, the base station SeNB restricts the number of (E)PDCCH DCI format candidates in the USS from this time point (step 503). During this period of restriction, in the (E)PDCCH for the user apparatus UE, only DCI format remaining by restriction is used.

In the user apparatus UE, an ra-Response Window period for waiting for an RAR starts after a predetermined period (2 subframes) from the transmission of the Random Access Preamble, so that the user apparatus UE starts the reduced number of BDs from the start of the period (step 504). That is, although the user apparatus UE receives PDCCHs from the base station SeNB and the base station MeNB, the user apparatus UE performs BDs on restricted candidates as shown in FIG. 20 and FIG. 21 for the USS of the PDCCH received from the base station SeNB.

The user apparatus UE receives the RAR (message 2) (step 505), so as to perform UL-SCH data transmission (uplink data transmission) based on the assignment information (step 506). In the base station SeNB, when the ra-Response Window period ends, or when PUSCH reception corresponding to the UL grant specified by the RAR is performed, the base station SeNB releases (E)PDCCH DCI format candidate number restriction in the USS of the base station SeNB at that time point since RAR transmission is not performed after that (step 507).

On the other hand, the user apparatus UE stops BD based on (E)PDCCH DCI format candidate number restriction in the USS of the base station SeNB (step 508) at a timing when the ra-Response Window period ends or a timing when PUSCH transmission (the above-mentioned UL-SCH data transmission) corresponding to an UL grant specified by the RAR is performed.

<Embodiment 2-3>

Next, the embodiment 2-3 is described. As described before, in the embodiment 2-3, the number of DCI format candidates in a CSS of the base station MeNB and the base station SeNB is restricted.

Figure 23:
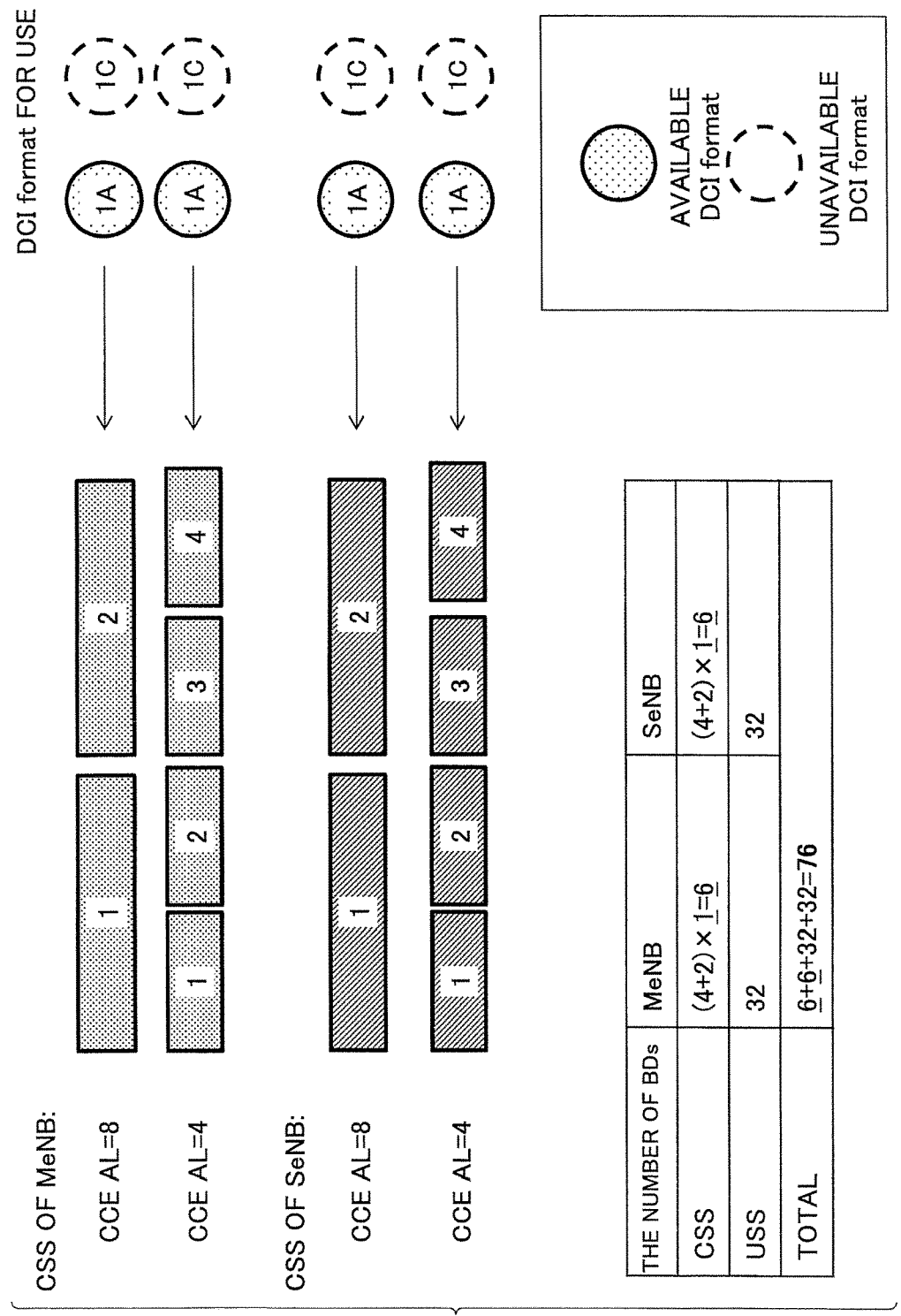
FIG. 23 is a diagram showing an example of a method for restricting the number of DCI format candidates in a CSS of a base station MeNB and a base station SeNB.

FIG. 23 shows an example of a restriction method. In the example shown in FIG. 23, the number of DCI format candidates in Aggregation level=8 is restricted to 1, and the number of DCI format candidates in Aggregation level=4 is restricted to 1 in each CSS of the base station MeNB and the base station SeNB. In each case, DCI format 1C is reduced.

By restricting in this way, the number of BDs in the CSS of the base station MeNB becomes 6. Since the number of BDs in the CSS of the base station MeNB is 12 when such a restriction is not performed, 6 of BDs are reduced. Also, the number of BDs in the CSS of the base station SeNB becomes 6. Since the number of BDs in the CSS of the base station SeNB is 12 when such a restriction is not performed, 6 of BDs are reduced. Thus, 12 of BDs are reduced in total. That is, reduction for the CSS of the base station SeNB is performed.

Figure 24:
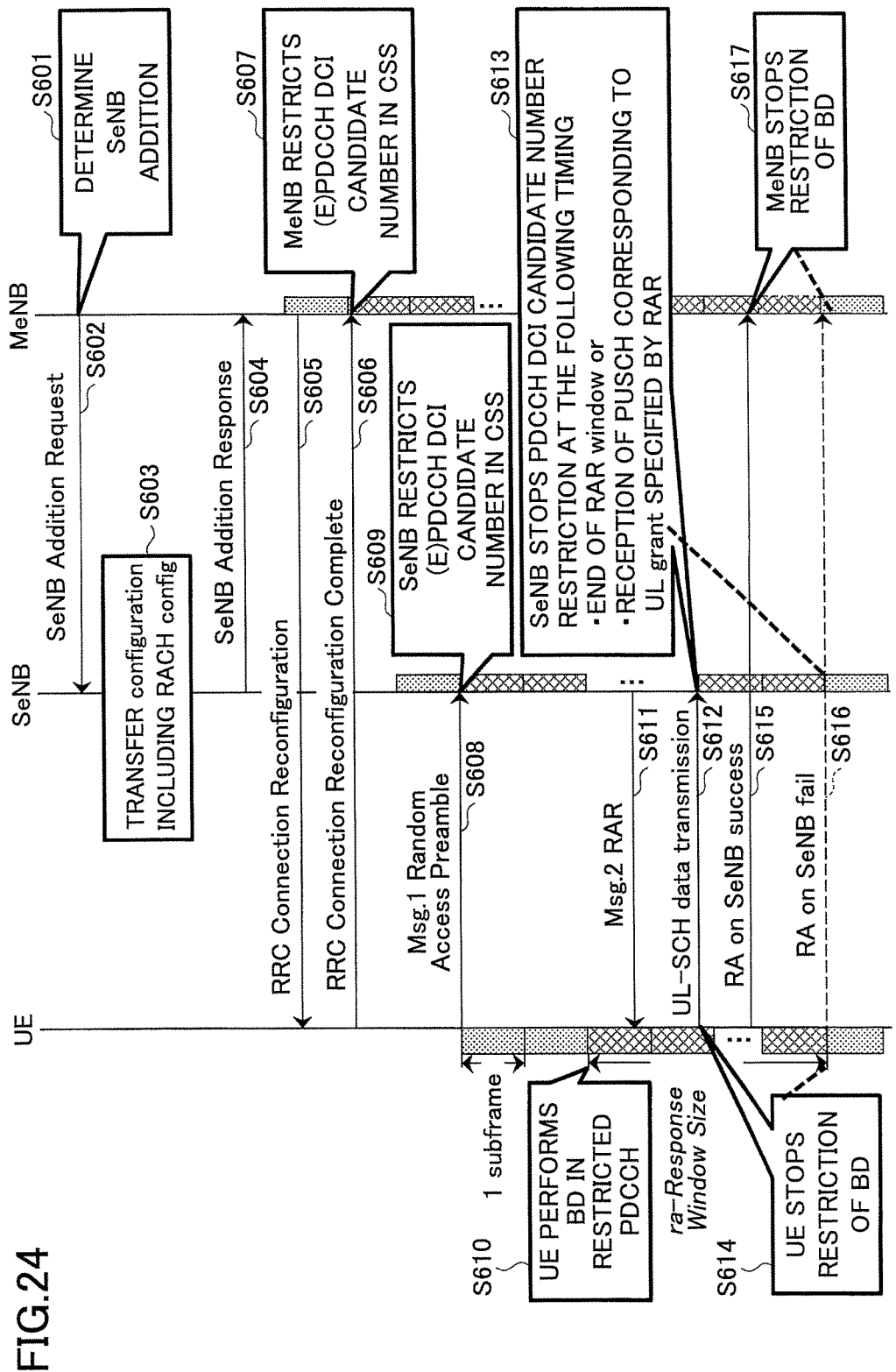
FIG. 24 is a sequence example in an embodiment 2-3.

FIG. 24 shows a sequence example in the embodiment 2-3. When the base station MeNB determines to add a resource of the base station SeNB (step 601), the base station MeNB transmits an SeNB Addition Request to the base station SeNB (step 602). The base station SeNB that receives the SeNB Addition Request determines to provide a configuration including a RACH config (step 603) so as to transmit an SeNB Addition Response including the configuration to the base station MeNB (step 604).

The base station MeNB that receives the SeNB Addition Response transmits, to the user apparatus UE, an RRC Connection Reconfiguration (RRC connection re-setting) including control information for SeNB addition (step 605), and the user apparatus UE returns an RRC Connection Reconfiguration Complete (RRC connection re-setting complete) to the base station MeNB (step 606). The base station MeNB that receives the RRC Connection Reconfiguration Complete recognizes that the base station SeNB is added to the communication with the user apparatus UE. Thus, since there is a possibility that an RA procedure between the base station SeNB and the user apparatus UE is performed, the base station MeNB restricts the number of (E)PDCCH DCI format candidates in the CSS from this time point (example: FIG. 23). During this period of restriction, in the (E)PDCCH for the user apparatus UE, only DCI format remaining by restriction is used.

A Random Access Preamble (message 1) is transmitted from the user apparatus UE to the base station SeNB (step 608). Since the base station SeNB that receives the Random Access Preamble transmits an RAR by the CSS, the base station SeNB restricts the number of (E)PDCCH DCI format candidates in the CSS from this time point (step 609).

In the user apparatus UE, an ra-Response Window period for waiting for an RAR starts after a predetermined period (2 subframes) from Random Access Preamble transmission, so that the user apparatus UE starts the reduced number of BDs from the start of the period (step 610). That is, the user apparatus UE performs BDs on restricted DCI format candidates as shown in FIG. 23 for the CSS of the PDCCH received from the base station SeNB and the base station MeNB.

The user apparatus UE receives the RAR (message 2) (step 611), so as to perform UL-SCH data transmission (uplink data transmission) based on the assignment information (step 612). In the base station SeNB, when the ra-Response Window period ends, or when PUSCH reception corresponding to the UL grant specified by the RAR is performed, the base station SeNB releases (E) PDCCH DCI format candidate number restriction in the CSS at that time point since RAR transmission is not performed after that (step 613).

On the other hand, the user apparatus UE stops BD based on (E)PDCCH DCI format candidate number restriction in the CSS of the base station SeNB (step 614) at a timing when the ra-Response Window period ends or a timing when PUSCH transmission (the above-mentioned UL-SCH data transmission) corresponding to an UL grant specified by the RAR is performed.

When the user apparatus UE succeeds the RA procedure with the base station SeNB, the user apparatus UE transmits an RA on SeNB success to the base station MeNB (step 615). The base station MeNB that receives the RA on SeNB success recognizes that RAR transmission from the base station SeNB to the user apparatus UE ends to release the (E)PDCCH DCI format candidate number restriction in the CSS (step 617). When the RA procedure with the base station SeNB fails, the user apparatus UE transmits an RA on SeNB fail to the base station MeNB (step 616). The base station MeNB that receives the RA on SeNB fail recognizes that RAR transmission from the base station SeNB to the user apparatus UE ends, and the base station MeNB releases (E)PDCCH DCI format candidate number restriction in the CSS (step 617).

Embodiments 2-1-2-3 may be carried out by combining them. Also, the first embodiment and the second embodiment may be carried out by combining them.

(Modified Example)

In the second embodiment, although a specific DCI is skipped uniformly for Aggregation Levels (AL), DCI for skipping may be different for each AL. For example, DCI format 1A is used for fallback mode. However, the possibility in that ALs 1 and 2 are used in the fallback mode is low. Thus, in ALs 1 and 2, DCI format 1A may be excluded from the candidates. On the other hand, for the DCI formats 2 and 4, since there is a possibility that these are used in many cases, it is desirable not to skip them irrespective of AL as much as possible. Also, since it is unlikely that AL1 is used in DCI format 1, DCI format 1 may be skipped for AL1.

Also, which DCI to skip for each AL may be determined based on payload size or the number of REs of DCI, whether PDCCH or EPDCCH, whether localized-EPDCCH or distributed-EPDCCH, radio quality (CQI) of the user apparatus UE, or the like.

As to the above-mentioned radio quality, since an AL used in PDCCH is selected based on radio quality of the user apparatus UE in general, BD may be skipped for an AL inadequate to radio quality. This point is common to the first embodiment and the second embodiment.

Figure 25:
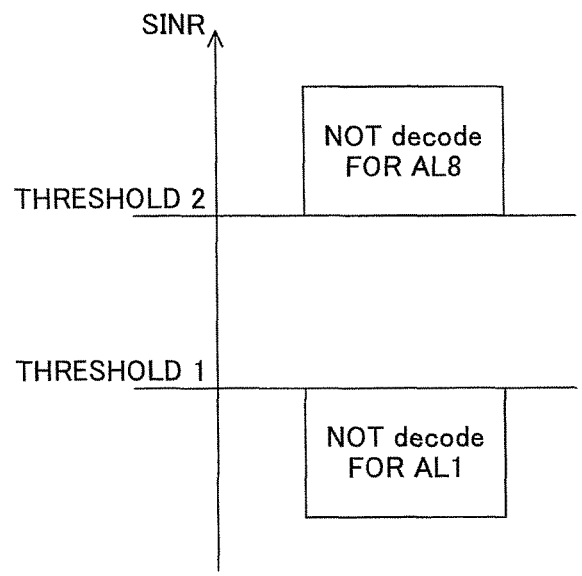
FIG. 25 is a diagram for explaining a modified example.

A concrete example of control is described with reference to FIG. 25. The base station eNB sets a threshold 1 and a threshold 2 for the user apparatus UE. This setting may be performed by an RRC signaling, or may be performed dynamically by PDCCH. As shown in FIG. 25, the threshold 1 is a threshold of radio quality for restricting decoding for AL1, and the threshold 2 is a threshold for restricting decoding for AL8. In the example of FIG. 25, although SINR is shown as radio quality, this may be CQI.

When the current radio quality is worse than the threshold 1, the user apparatus UE does not perform BD for candidates of AL1 since it can be estimated that AL1 is not selected in the base station eNB. This is because the user apparatus UE cannot ensure sufficient reception quality by AL1.

Also, when the current radio quality is better than the threshold 2, the user apparatus UE does not perform BD for candidates of AL8 since it can be estimated that AL8 is not selected in the base station eNB. This is because, when radio quality is good, resource utilization efficiency is deteriorated if AL8 is used.

The base station eNB observes quality information (example: CQI/RSRP/RSRQ) from the UE, and estimates for which AL the UE performs BD at that time point to perform assignment.

(Apparatus Configuration Example)

In the following, functional configurations of the user apparatus UE and the base station eNB (SeNB, MeNB) that perform processing in the embodiments of the present invention described so far are described. By the way, the configuration of each apparatus describe below indicates a configuration especially related to the present embodiment. Each of the user apparatus UE and the base station eNB includes functions, as its basic functions, for executing operations defined in Rel-12 of LTE and the like.

Figure 26:
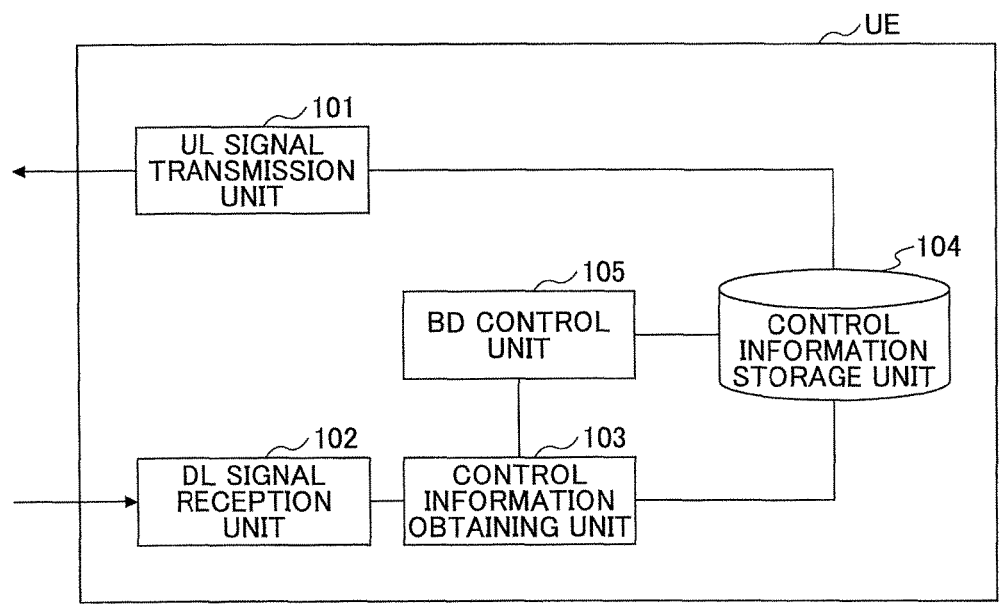
FIG. 26 is a functional block diagram of a user apparatus UE.

FIG. 26 shows a functional block diagram of the user apparatus UE. As shown in FIG. 26, the user apparatus UE includes an UL signal transmission unit 101, a DL signal reception unit 102, a control information obtaining unit 103, a control information storage unit 104, and a BD control unit 105.

The UL signal transmission unit 101 transmits a radio signal to the base station eNB. The DL signal reception unit 102 receives a radio signal from the base station eNB. The control information obtaining unit 103 obtains control information from a signal received from the DL signal reception unit 102. The control information obtaining unit 103 performs processing including BD and RAR reception (obtaining) described so far.

The control information storage unit 104 stores control information obtained by the control information obtaining unit 103. This control information includes information transmitted by RRC signaling, system information, dynamic resource assignment information and the like. Also, the control information storage unit 104 stores information that is set beforehand in a fixed manner, and the like. The UL signal transmission unit 101 performs transmission of an uplink signal using a predetermined resource based on control information (assignment information and the like) stored in the control information storage unit 104. The BD control unit 105 monitors an Ra-Response window and the like, and instructs the control information obtaining unit 103 to start/end BD reduction and the like to perform control of reduction of the number of BDs. That is, the BD control unit 105 performs control related to BD number reduction in the user apparatus UE described so far.

Figure 27:
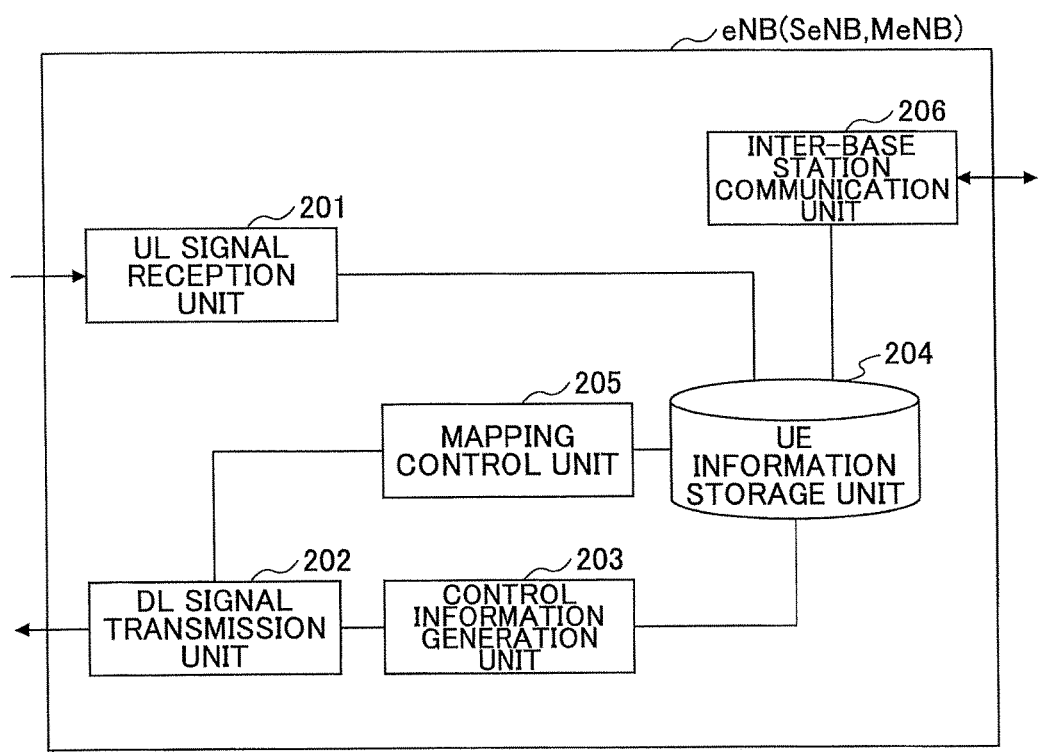
FIG. 27 is a functional block diagram of a base station (MeNB, SeNB).

FIG. 27 shows a functional configuration of the base station eNB in the present embodiment. It is assumed that the base station eNB is a base station that can support both of MeNB and SeNB. As shown in FIG. 27, the base station eNB includes an UL signal reception unit 201, a DL signal transmission unit 202, a control information generation unit 203, a UE information storage unit 204, a mapping control unit 205 and an inter-base station communication unit 206.

The UL signal reception unit 201 receives a radio signal from a user apparatus UE. The DL signal transmission unit 202 transmits a radio signal to the user apparatus UE. The control information generation unit 203 generates control information such as RAR and assignment information based on information (including reception quality, configuration, CA state and the like) of the user apparatus UE stored in the UE information storage unit 204. Also, as described so far, the control information generation unit 203 also performs restriction of DCI format according to the state of the user apparatus UE. That is, the control information generation unit 203 performs operation for selecting a format from among formats obtained by excluding, from a plurality of formats, a part of the plurality of formats. Also, as described so far, the mapping control unit 205 performs determination of Aggregation level, mapping of a DCI to CSS/USS (including restricted mapping) according to a state of the user apparatus UE. That is, the mapping control unit 205 performs operation for selecting an area to which a DCI addressed to the user apparatus is mapped from areas obtained by excluding, from a plurality of candidate areas, a part of areas.

When the UL signal reception unit 201 receives UE information such as reception quality information and the like from the user apparatus UE, the UL signal reception unit 201 stores it in the UE information storage unit 204. Also, the inter-base station communication unit 206 performs communication with another base station (MeNB, SeNB) via a backhaul circuit to perform transmission and reception of information of connected user apparatuses UE and the like.

The apparatus configurations for realizing processing of the present embodiment are not limited to the above-mentioned ones. For example, the following configurations can be adopted. Following configurations are substantially the same as those described so far.

That is, the user apparatus of the present embodiment is a user apparatus that communicates with a base station in a mobile communication system, including:

a reception unit configured to receive a radio signal from the base station by a downlink control channel; and a control information detection unit configured to detect control information, addressed to the user apparatus, mapped to a predetermined area in a time frequency resource of the downlink control channel by performing blind decoding in a plurality of candidate areas which are candidates of the predetermined area, wherein, when the user apparatus performs a random access procedure, the control information detection unit performs the blind decoding in areas in which a part of areas is excluded from the plurality of candidate areas. According to this configuration, it is possible to decrease the number of candidates that become targets of blind decoding performed when receiving control information transmitted by a downlink control channel.

Also, during a period when the user apparatus monitors reception of a random access response from the base station or during a period when the user apparatus monitors reception of a random access response from another base station that is different from the base station, the control information detection unit performs the blind decoding in areas in which a part of areas is excluded from the plurality of candidate areas. According to this configuration, even when performing blind decoding of CSS for receiving a random access response from an SeNB, increase of the number of candidates for blind decoding can be avoided.

Also, the user apparatus of the present embodiment is a user apparatus that communicates with a base station in a mobile communication system, including:

a reception unit configured to receive a radio signal from the base station by a downlink control channel; and a control information detection unit configured to detect control information, addressed to the user apparatus, mapped to a predetermined area in a time frequency resource of the downlink control channel by performing blind decoding in a plurality of candidate areas which are candidates of the predetermined area, wherein, when there are a plurality of format candidates of the control information and when the user apparatus performs a random access procedure, the control information detection unit performs the blind decoding by assuming formats in which a part of candidates is excluded from the plurality of format candidates.

During a period when the user apparatus monitors reception of a random access response from the base station or during a period when the user apparatus monitors reception of a random access response from another base station that is different from the base station, the control information detection unit performs the blind decoding by assuming formats in which a part of candidates is excluded from the plurality of format candidates. According to this configuration, even when performing blind decoding of CSS for receiving a random access response from an SeNB, increase of the number of candidates for blind decoding can be avoided.

The base station of the present embodiment is a base station that performs communication with a user apparatus in a mobile communication system, including:

a mapping unit configured to map control information, addressed to the user apparatus, to a predetermined area in a time frequency resource of a downlink control channel; and a transmission unit configured to transmit the control information, as a radio signal, by a downlink control channel using a time frequency resource of the predetermined area, wherein the predetermined area is an area among a plurality of candidate areas where blind decoding is performed for detecting the control information in the user apparatus, and wherein, when the user apparatus performs a random access procedure, the mapping unit selects the predetermined area from among areas in which a part of area is excluded from the plurality of candidate areas.

During a period when it is estimated that the user apparatus monitors a random access response, the mapping unit selects the predetermined area from among areas in which a part of area is excluded from the plurality of candidate areas.

The base station of the present embodiment is a base station that performs communication with a user apparatus in a mobile communication system, including:

a control information generation unit configured to generate control information addressed to the user apparatus by using one format in a plurality of predetermined formats;

a mapping unit configured to map the control information, addressed to the user apparatus, to a predetermined area in a time frequency resource of a downlink control channel; and a transmission unit configured to transmit the control information, as a radio signal, by a downlink control channel using a time frequency resource of the predetermined area, wherein, when the user apparatus performs a random access procedure, the control information generation unit selects the one format from among formats in which a part of formats is excluded from the plurality of formats.

During a period when it is estimated that the user apparatus monitors a random access response, the control information generation unit selects the one format from among formats in which a part of formats is excluded from the plurality of formats.

The user apparatus UE described in the present embodiments may include a CPU and a memory and may be realized by executing a program by the CPU (processor), or may be realized by hardware such as hardware circuits including logics of processing described in the present embodiments, or may be configured by coexistence of a program and hardware.

The base station eNB described in the present embodiment may include a CPU and a memory and may be realized by executing a program by the CPU (processor), or may be realized by hardware such as hardware circuits including logics of processing described in the present embodiments, or may be configured by coexistence of a program and hardware.

In the above, embodiments of the present invention have been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, such an apparatus may be implemented in hardware, software, or a combination thereof. The software that executes operation according to embodiments of the present invention by a processor provided in the user apparatus, and the software that operates by a processor provided in the base station may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international patent application claims priority based on Japanese patent application No. 2014-016207, filed in the JPO on Jan. 30, 2014, and the entire contents of the Japanese patent application No. 2014-016207 are incorporated herein by reference.

DESCRIPTION OF REFERENCE SIGNS

MeNB, SeNB base station
UE user apparatus
101 UL signal transmission unit
102 DL signal reception unit
103 control information obtaining unit
104 control information storage unit
105 BD control unit
201 UL signal reception unit
202 DL signal transmission unit
203 control information generation unit
204 UE information storage unit
205 mapping control unit
206 inter-base station communication unit

The invention claimed is:

1. A user apparatus that communicates with a base station in a mobile communication system, comprising:
 a reception unit configured to receive a radio signal from the base station by a downlink control channel; and
 a control information detection unit configured to detect control information, addressed to the user apparatus, mapped to a predetermined area in a time frequency resource of the downlink control channel by performing blind decoding in a plurality of candidate areas which are candidates of the predetermined area,
 wherein the mobile communication system communicates using dual connectivity, and
 wherein the control information detection unit performs the blind decoding in areas in which a part of areas is excluded from the plurality of candidate areas based on configuration information from a master base station (MeNB) of a plurality of base stations in the dual connectivity.

2. The user apparatus as claimed in claim 1, wherein, during a period when the user apparatus monitors reception of a random access response from the base station or during a period when the user apparatus monitors reception of a random access response from another base station that is different from the base station, the control information detection unit performs the blind decoding in areas in which a part of areas is excluded from the plurality of candidate areas.

3. A user apparatus that communicates with a base station in a mobile communication system, comprising:
   a reception unit configured to receive a radio signal from the base station by a downlink control channel; and
   a control information detection unit configured to detect control information, addressed to the user apparatus, mapped to a predetermined area in a time frequency resource of the downlink control channel by performing blind decoding in a plurality of candidate areas which are candidates of the predetermined area,
   wherein the mobile communication system communicates using dual connectivity, and
   wherein, when there are a plurality of format candidates of the control information, the control information detection unit performs the blind decoding by assuming formats in which a part of candidates is excluded from the plurality of format candidates based on configuration information from a master base station (MeNB) of a plurality of base stations in the dual connectivity.

4. The user apparatus as claimed in claim 3, wherein, during a period when the user apparatus monitors reception of a random access response from the base station or during a period when the user apparatus monitors reception of a random access response from another base station that is different from the base station, the control information detection unit performs the blind decoding by assuming formats in which a part of candidates is excluded from the plurality of format candidates.

5. A base station that performs communication with a user apparatus in a mobile communication system, comprising:
   a mapping unit configured to map control information, addressed to the user apparatus, to a predetermined area in a time frequency resource of a downlink control channel; and
   a transmission unit configured to transmit the control information, as a radio signal, by a downlink control channel using a time frequency resource of the predetermined area,
   wherein the predetermined area is an area among a plurality of candidate areas where blind decoding is performed for detecting the control information in the user apparatus, and wherein the transmission unit transmits predetermined configuration information to the user apparatus, and the mapping unit selects the predetermined area from among areas in which a part of areas is excluded from the plurality of candidate areas, and
   wherein the mobile communication system communicates using dual connectivity, and the base station is a master base station (MeNB) of a plurality of base stations in the dual connectivity.

6. The base station as claimed in claim 5, wherein, during a period when it is estimated that the user apparatus monitors a random access response, the mapping unit selects the predetermined area from among areas in which a part of areas is excluded from the plurality of candidate areas.

7. A base station that performs communication with a user apparatus in a mobile communication system, comprising:
   a control information generation unit configured to generate control information addressed to the user apparatus by using one format in a plurality of predetermined formats;
   a mapping unit configured to map the control information, addressed to the user apparatus, to a predetermined area in a time frequency resource of a downlink control channel; and
   a transmission unit configured to transmit the control information, as a radio signal, by a downlink control channel using a time frequency resource of the predetermined area,
   wherein, the transmission unit transmits predetermined configuration information to the user apparatus, and the control information generation unit selects the one format from among formats in which a part of formats is excluded from the plurality of formats, and
   wherein the mobile communication system communicates using dual connectivity, and the base station is a master base station (MeNB) of a plurality of base stations in the dual connectivity.

8. The base station as claimed in claim 7, wherein, during a period when it is estimated that the user apparatus monitors a random access response, the control information generation unit selects the one format from among formats in which a part of formats is excluded from the plurality of formats.

9. A control information detection method executed by a user apparatus that communicates with a base station in a mobile communication system, comprising:
   a reception step of receiving a radio signal from the base station by a downlink control channel; and
   a control information detection step of detecting control information, addressed to the user apparatus, mapped to a predetermined area in a time frequency resource of the downlink control channel by performing blind decoding in a plurality of candidate areas which are candidates of the predetermined area,
   wherein the mobile communication system communicates using dual connectivity, and
   wherein the user apparatus performs the blind decoding in areas in which a part of areas is excluded from the plurality of candidate areas based on configuration information from a master base station (MeNB) of a plurality of base stations in the dual connectivity in the control information detection step, and.

10. A control information detection method executed by a user apparatus that communicates with a base station in a mobile communication system, comprising:
   a reception step of receiving a radio signal from the base station by a downlink control channel; and
   a control information detection step of detecting control information, addressed to the user apparatus, mapped to a predetermined area in a time frequency resource of the downlink control channel by performing blind decoding in a plurality of candidate areas which are candidates of the predetermined area,
   wherein the mobile communication system communicates using dual connectivity, and
   wherein, when there are a plurality of format candidates of the control information, the user apparatus performs the blind decoding assuming formats in which a part of candidates is excluded from the plurality of format candidates based on configuration information from a master base station (MeNB) of a plurality of base stations in the dual connectivity in the control information detection step, and.

* * * * *